US008849115B2

(12) United States Patent  (10) Patent No.: US 8,849,115 B2
Blair et al.  (45) Date of Patent: Sep. 30, 2014

(54) DIRECTIONLESS OPTICAL ARCHITECTURE AND HIGHLY AVAILABLE NETWORK AND PHOTONIC RESILIENCE METHODS

(75) Inventors: Loudon Blair, Severna Park, MD (US); Michael Y. Frankel, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 1388 days.

(21) Appl. No.: 12/045,933

(22) Filed: Mar. 11, 2008

(65) Prior Publication Data
US 2009/0232492 A1 Sep. 17, 2009

(51) Int. Cl.
*H04J 14/02* (2006.01)
*H04Q 11/00* (2006.01)

(52) U.S. Cl.
CPC .......... *H04Q 11/0062* (2013.01); *H04J 14/029* (2013.01); *H04J 14/0212* (2013.01); *H04J 14/0209* (2013.01); *H04Q 2011/0081* (2013.01); *H04J 14/0227* (2013.01); *H04J 14/0291* (2013.01); *H04J 14/0284* (2013.01); *H04J 14/0206* (2013.01); *H04J 14/0246* (2013.01); *H04J 14/0213* (2013.01); *H04J 14/0294* (2013.01); *H04J 14/0295* (2013.01); *H04J 14/0217* (2013.01); *H04J 14/025* (2013.01)
USPC .................................. 398/49; 398/50; 398/83

(58) Field of Classification Search
USPC ............................................... 398/48–50, 83
See application file for complete search history.

(56) References Cited

U.S. PATENT DOCUMENTS

| | | | |
|---|---|---|---|
| 5,838,848 A | 11/1998 | Laude | |
| 6,285,500 B1 | 9/2001 | Ranalli et al. | |
| 6,335,992 B1 * | 1/2002 | Bala et al. ........................ | 385/17 |
| 6,600,852 B1 | 7/2003 | Augustsson | |
| 6,771,852 B2 | 8/2004 | Hemenway et al. | |
| 6,876,475 B1 | 4/2005 | Trisnadi et al. | |
| 6,937,993 B1 | 8/2005 | Gabbita et al. | |
| 7,043,110 B1 | 5/2006 | Trisnadi et al. | |
| 7,072,539 B2 | 7/2006 | Wu et al. | |
| 7,092,599 B2 | 8/2006 | Frisken | |
| 7,099,529 B2 | 8/2006 | Wang et al. | |
| 7,123,592 B2 | 10/2006 | Geile et al. | |

(Continued)

OTHER PUBLICATIONS

S. Thiagarajan, L. Blair, and J. Berthold, "Direction-Independent Add/Drop Access for Multi-Degree ROADMs," in Optical Fiber Communication Conference and Exposition and The National Fiber Optic Engineers Conference, OSA Technical Digest (CD) (Optical Society of America, Feb. 24, 2008.*

(Continued)

*Primary Examiner* — Nathan Curs
(74) *Attorney, Agent, or Firm* — Clements Bernard PLLC; Christopher L. Bernard; Lawrence A. Baratta, Jr.

(57) ABSTRACT

The present invention provides a directionless optical architecture for reconfigurable optical add/drop multiplexers (ROADMs) and wavelength selective switches (WSSs). The directionless architecture utilizes a directionless wavelength switch coupled between client devices and ROADMs/WSSs to eliminate the need to hard-wire client devices to a wavelength division multiplexed (WDM) network. Accordingly, client device connections can be automatically routed without manual intervention to provide a highly resilient network design which can recover route diversity during failure scenarios. Additionally, the present invention minimizes deployments of costly optical transceivers while providing superior resiliency. Further, the present invention couples the directionless optical architecture and associated optical protection mechanisms with existing mesh restoration schemes to provide additional resiliency.

12 Claims, 45 Drawing Sheets

(56) References Cited

U.S. PATENT DOCUMENTS

| | | |
|---|---|---|
| 7,167,441 B2 | 1/2007 | Donoghue et al. |
| 7,167,646 B2 | 1/2007 | Chin et al. |
| 7,171,070 B1 | 1/2007 | Birk et al. |
| 7,181,139 B2 | 2/2007 | Handelman et al. |
| 7,200,331 B2 | 4/2007 | Roorda et al. |
| 7,212,703 B2 | 5/2007 | Wu |
| 7,212,704 B2 | 5/2007 | Ducellier et al. |
| 7,218,805 B2 | 5/2007 | Oberg |
| 7,221,821 B2 | 5/2007 | Eldada |
| 7,228,027 B1 | 6/2007 | Birk et al. |
| 7,231,107 B1 | 6/2007 | Zhong et al. |
| 7,254,327 B1 | 8/2007 | Zhong et al. |
| 7,257,285 B2 | 8/2007 | Doerr et al. |
| 7,257,288 B1 | 8/2007 | Strasser et al. |
| 7,263,253 B2 | 8/2007 | Davis et al. |
| 7,277,608 B2 | 10/2007 | Isomura et al. |
| 7,283,709 B2 | 10/2007 | Doerr et al. |
| 2001/0009465 A1* | 7/2001 | Uehara .......................... 359/124 |
| 2002/0089712 A1* | 7/2002 | Kang et al. .................... 359/110 |
| 2003/0169470 A1* | 9/2003 | Alagar et al. .................. 359/110 |
| 2003/0215238 A1* | 11/2003 | Milton et al. ................... 398/83 |
| 2004/0186701 A1* | 9/2004 | Aubin et al. ...................... 703/13 |
| 2004/0228631 A1* | 11/2004 | Mantin et al. .................... 398/83 |
| 2005/0273516 A1 | 12/2005 | Patrick et al. |
| 2005/0273521 A1 | 12/2005 | Patrick et al. |
| 2006/0031354 A1 | 2/2006 | Patrick et al. |
| 2006/0031355 A1 | 2/2006 | Patrick et al. |
| 2006/0031431 A1 | 2/2006 | Patrick et al. |
| 2006/0031432 A1 | 2/2006 | Patrick et al. |
| 2006/0031433 A1 | 2/2006 | Patrick et al. |
| 2006/0031481 A1 | 2/2006 | Patrick et al. |
| 2006/0031930 A1 | 2/2006 | Patrick et al. |
| 2006/0034237 A1 | 2/2006 | Patrick et al. |
| 2006/0045528 A1 | 3/2006 | Gumaste et al. |
| 2006/0078332 A1* | 4/2006 | Fang et al. ....................... 398/19 |
| 2006/0098981 A1 | 5/2006 | Miura et al. |
| 2006/0198575 A1 | 9/2006 | Doerr et al. |
| 2006/0198583 A1 | 9/2006 | Oikawa et al. |
| 2006/0198636 A1 | 9/2006 | Charlet et al. |
| 2006/0210268 A1 | 9/2006 | Gumaste et al. |
| 2006/0210273 A1 | 9/2006 | Gumaste et al. |
| 2006/0228072 A1 | 10/2006 | Davis et al. |
| 2006/0275035 A1 | 12/2006 | Way |
| 2007/0009204 A1 | 1/2007 | Ducellier et al. |
| 2007/0036480 A1 | 2/2007 | Wu |
| 2007/0081761 A1 | 4/2007 | Doerr et al. |
| 2007/0116462 A1 | 5/2007 | Peloso et al. |
| 2007/0140618 A1 | 6/2007 | Doerr et al. |
| 2007/0160321 A1 | 7/2007 | Wu et al. |
| 2007/0183777 A1 | 8/2007 | Peloso et al. |
| 2007/0189775 A1* | 8/2007 | Charlet et al. ................. 398/147 |
| 2007/0196106 A1 | 8/2007 | Eiselt |
| 2007/0204046 A1 | 8/2007 | Batta et al. |
| 2007/0237451 A1 | 10/2007 | Colbourne |
| 2007/0242953 A1 | 10/2007 | Keyworth et al. |
| 2007/0255640 A1 | 11/2007 | Gumaste |
| 2007/0269210 A1 | 11/2007 | Doerr et al. |
| 2007/0269211 A1 | 11/2007 | Doerr et al. |
| 2007/0274724 A1 | 11/2007 | Gumaste |
| 2008/0118245 A1* | 5/2008 | Chang et al. ..................... 398/79 |
| 2008/0181605 A1* | 7/2008 | Palacharla et al. .............. 398/50 |

OTHER PUBLICATIONS

Lei Zong, Xiaodong Huang, Ting Wang, Philip Ji, Omatsu Matsuda, Milorad Cvijetic; "A Novel Tunable DeMEX/MUX Solution for WSS-Based ROADM and WXC Nodes"; 1. NEC Laboratories America, Inc., Princeton, NJ; 2. Department of Computer Science, the University of Texas in Dallas, Richardson, TX; 3. NEC Corporation, Chiba 270-1198, Japan; 4. NEC America, Inc., Herndon, VA; (c)2005 Optical Society of America; OCIS codes: (060.0060) Fiber optics and optical communications; (060,4250) Networks.

Sashisekaran Thiagarajan, Loudon Blair, Joseph Berthold; "Direction-Independent Add/Drop Access for Multi-Degree ROADMs"; Office of the CTO, Ciena Corporation, Linthicum, MD; (c)Optical Society of America; OCIS Codes: (060.4250) Networks; (060.4510) Optical Communications; (060.1155) All-Optical Networks, Feb. 24, 2008.

* cited by examiner

DIRECTIONLESS OPTICAL ARCHITECTURE AND HIGHLY AVAILABLE NETWORK AND PHOTONIC RESILIENCE METHODS

FIELD OF THE INVENTION

The present invention relates generally to optical networks. More particularly, the present invention provides a directionless optical architecture for reconfigurable optical add/drop multiplexers (ROADMs) and wavelength selective switches (WSSs) which can be utilized to provide highly available network, photonic resiliency, and wavelength optimization.

BACKGROUND OF THE INVENTION

As point-to-point Internet Protocol (IP) flows increase in bandwidth, core router connections are being driven to higher capacities. Today, core router interfaces are starting to move from 10 Gbps to 40 Gbps while 100 Gbps connections are already in the planning stage. With this increase in capacity comes a heightened responsibility to maintain high availability service by minimizing the time that these very expensive, high bandwidth connections are out of service due to failure events or scheduled maintenance activities.

Referring to FIGS. 1 and 2, a network 10 illustrates core routers 12a, 12b, 12c with mesh connections directly over a statically provisioned wavelength division multiplexed (WDM) transport layer. The core routers 12a,12b,12c can include IP routers with direct optical interfaces, such as 10 Gbps, 40 Gbps, etc. In this example, each core router 12a, 12b,12c connects optically to a Wavelength Selective Switch (WSS) 14. The network 10 includes multiple WSSs 14 at various geographically-diverse locations 16 where regeneration of signals may take place or where other signals may be added to or dropped from the WDM line. The WSSs 14 are configured to receive a client signal, such as from the core routers 12a,12b,12c, and to provide a WDM line signal formed by multiplexing multiple client signals, such as with an optical multiplexer with optical filters (not shown). Each node can also include other components (not shown), such as optical amplifiers, dispersion compensation modules (DCM), and the like.

The WSSs 14 connect each of the various locations 16 in a mesh configuration through optical fibers. Conventionally, the core routers 12a,12b,12c are connected through the WSSs 14 statically, and bandwidth on each wavelength connection is typically traffic engineered to a predetermined capacity below the maximum possible capacity, such as 50%, 40%, 20%, etc., so as to accommodate a layer three initiated roll over of traffic from a failed link to a working link upon a network failure, such as a fiber cut, equipment failure on the WSSs 14, failure on the core router 12, and the like. For example, in FIG. 1, the core router 12a is provisioned over the WSSs 14 to connect to the core routers 12b and 12c with a maximum of 50% traffic over each link such that in the event of a failure, sufficient capacity is available to accommodate both working and protected traffic.

In FIG. 2, a failure 18, e.g. a fiber cut, optical transceiver failure, network maintenance event (note, a maintenance event has the same effect as a failure), etc., is illustrated between the core routers 12a and 12b causing the traffic to be interrupted on this link, i.e. 0% fill. Here, traffic from the core routers 12a and 12b is rolled to the links between core routers 12a to 12c and from core routers 12b to 12c at layer three by the core routers 12a,12b, i.e. the routers located at either end of the failed connection. Now, while the link between core routers 12a to 12b is out of service, the network 10 is vulnerable to additional failures on links between core routers 12a to 12c (isolating router 12a) and/or between core routers 12b to 12c (isolating router 12b).

While the architecture of the network 10 is reasonably efficient from a capital equipment ("CAPEX") perspective, it raises some challenges that can impact the operating expenses ("OPEX") required to operate and maintain this network 10. One challenge is associated with how the links between the routers 12a,12b,12c are protected. While the link between routers 12a to 12b is down, the network 10 core is operating in a dangerous condition whereby any second failure could potentially isolate a region of the network 10. The Median Time to Repair (MTTR) becomes a critical parameter in the calculation of service availability and the corresponding service level agreements (SLAs) that can be offered to end user clients. Providing the ability to provide a new (third) path through the network 10 in the event of such a condition could help to minimize the MTTR for the connection and maintain high connection availability.

Another challenge is associated with the coordination of network maintenance activities between operations personnel who are responsible for the IP network, i.e. routers 12, and those responsible for the underlying transport connections, i.e. WSSs 14. Because core router 12 interfaces are directly associated with a statically defined WDM lightpath across the network 10, it is not possible to separate the two events. Without careful cooperation between operations personnel, it is possible that simultaneous maintenance could occur on links between routers 12a to 12b (by transport) and between routers 12a to 12c (by IP) causing unnecessary network disruption. Clearly, providing a mechanism to reconfigure the IP or optical layers independently is advantageous.

The use of optical cross connects (OXCs) based on an electrical switch fabric provides one possible solution that could provide optical layer re-configurability in the face of network failure or planned maintenance. However, there is concern that the cost of 40 G or 100 G interfaces required to support core router connections is not as cost effective as 10 G and therefore should be minimized throughout the transmission path, i.e. OXCs would require additional 40 G or 100 G interfaces. Furthermore, dedicating 40 G or 100 G modules on an OXC to aggregate flows of data is wasteful of precious backplane and switch capacity.

Referring to FIGS. 3 and 4, a network 20 illustrates core routers 12d,12e using optical 1+1 broadcast with tail-end protection on optical links between adjacent core routers 12d,12e. Here, the routers 12d,12e are connected through a single optical transceiver on each router 12d,12e. In this example, a unidirectional path is shown from the router 12d to the router 12e. At the router 12d, an optical splitter 22 is configured to split an output from a transceiver on the router 12d into two identical signals with each signal separately provided to a different WSS 14. At the router 12e, a tail end switch 24 is configured to receive outputs from two different WSSs 14. The switch 24 is configured to switch between WSSs 14 responsive to a condition, such as loss of signal.

To date, this kind of protection has been implemented on the short-reach link between core router interfaces and WDM transceivers. This protection scheme is not designed to protect against router 12d,12e or router port failure, however it does provide resistance to transport layer failures associated with optical layer components, i.e. the WSSs 14, and the optical fiber itself.

In FIG. 4, a failure 26 is illustrated on one link between the routers 12e and 12d. Upon failure, protection decisions are made locally, providing rapid (e.g., <50 ms) restoration times and significantly reducing the amount of complex routing table reconfiguration at layer three. In this protection scheme, the router 12d is broadcasting the same data signal to the router 12e over two separate paths through WSSs 14. The splitter 22 is unaffected by the failure 26, however the switch 24 is configured to switch to the backup or protect path upon the failure 26. Also, it is now possible to separate maintenance activities associated with different IP and optical operations teams by moving the physical path of the optical signal can be from the 'primary' to 'backup' route.

However, because of the static nature of the optical connectivity, it is not possible to reconfigure the optical layer so as to restore diverse links between the end nodes. Instead, after the link failure 26, the connection between the routers 12d and 12e is now unprotected for as long as the damaged link is under repair. For some carriers this is a significant issue. Depending on the physical route of an optical fiber, the MTTR for the damaged connection can be quite long (on the order of days to weeks). For example, some fibers are routed through inhospitable terrain such as over (or through) mountains or under lakes or seas where the maintenance activity can involve lengthy procedures. In this case, the carrier would like to re-establish a new 'backup' route quickly so as to restore diversity between end nodes and thus maintain the promise of high availability to end user clients.

Referring to FIGS. 5 and 6, many carriers are now deploying Wavelength Selective Switch (WSS) 14 technology into their networks to form a Reconfigurable Optical Add-Drop Multiplexer (ROADM) 30 node. The WSS 14 (and ROADM 30)) provide all-optical wavelength cross-connection functionality that supports lightpath reconfigurability at the photonic level. The ability to redirect lightpaths from one fiber direction to another direction makes the WSS 14 a promising component of a solution to re-establish a backup connections.

In FIG. 5, the ROADM 30 illustrates lightpath reconfigurability for lightpaths 32 between different WSSs 14. Note, in this configuration, the WSSs 14 may not require connections to transceivers or regenerators, but rather may include amplifiers, DCMs, multiplexers, etc. for all-optical pass-through at the ROADM 30. Here, the lightpaths 32 can be redirected from one output to any of the WSSs 14 (provided there is no wavelength conflict).

In FIG. 6, an IP router 12 and Optical Transport Network (OTN) platform 34 are connected to different WSSs 14. The OTN platform 34 is illustrated as an example, and could also include a SONET/SDH platform, an Ethernet platform, etc. Here, the add/drop traffic from the lightpaths 32 is directly associated with a specific direction (denoted by arrows 36). A shortcoming of ROADM 30 solutions as designed and implemented today is the fact that WDM add/drop traffic is typically associated per direction (or fiber degree) of the ROADM 30 node. The optical interface of the router 12, switch, platform 34, or the like wishing to communicate 'north' (i.e., in the direction of arrows 36) from a node must be hard-wired to the WSSs 14 associated with that direction. Therefore, while the pass-through traffic of today's ROADM 30 is highly flexible, the static connectivity of the add/drop traffic limits the flexibility of the end-to-end solution.

Referring to FIG. 7, ROADM 30 nodes are added at intermediate junction nodes to the network 20 of FIGS. 3 and 4 illustrating core routers 12d, 12e using optical 1+1 broadcast with tail-end protection on optical links between adjacent core routers 12d,12e. Adding the ROADM 30 to the core router 12d,12e interconnection example provides optical pass through at intermediate ROADM 30 nodes without the need for manual patching or terminal regeneration. However, because the add/drop function is dedicated on a per-direction basis, the solution with ROADM 30 is no more capable of re-establishing a second backup connection as the static network above.

Referring to FIG. 8, a conventional ROADM 40 illustrates the limitations associated with current directional architectures. The conventional ROADM 40 shows only drop-side connections for illustration purposes, and those of ordinary skill in the art will recognize that the ROADM 40 can also include add-side connections. Connections 42 from receivers 44 are hard wired in the conventional ROADM 40 and the intermediate ROADM 30 nodes in FIG. 7. A receiver's 44 wavelength is fixed by a channel demultiplexer 46 to a single value. Once plugged in, a transmitter cannot change wavelength. As network grows, there may be lots of stranded ports, and wavelengths cannot be dynamically re-optimized to reduce blocking probability. Further, connections to the receivers 44 cannot be automatically altered due to the hardwire connections 42 preventing rerouting to restore route diversity during failures.

Accordingly, the downtime associated with any network service (e.g., Ethernet, SONET/SDH, Fibre Channel, etc.) is directly associated with the quality of a network service and the associated Service Level Agreement (SLA) between a service provider (i.e., carrier) and a client. In addition to the conventional optical protection schemes described above, network elements (NEs) with protection schemes such as SONET Bi-directional Line Switched Ring/Uni-directional Path Switched Ring (BLSR/UPSR), SDH Multiplex Section-Shared Protection Ring/Sub-network Connection Protection (MSSPRing/SNCP), etc. have been developed as network 'self-healing' mechanisms.

More recently, mesh restoration has been implemented in networks to improve service availability by providing access to multiple backup paths. The ability to access more than one backup path through the network increases the probability that service will stay available to the end user, thus decreasing the average downtime a network experiences over the course of a year.

One of the major challenges facing a number of network operators today is a high incidence of fiber cuts occurring randomly in the network. Such failures are a common occurrence in developing nations such as India where significant new infrastructure building is taking place (resulting in lots of digging up of fiber cables). Because most of these carriers are currently using ring protection methods to protect service, their networks are only able to accommodate one fiber failure on a single ring at any one time. High fiber failure probability therefore leads to the isolation of network elements when two cuts occur simultaneously on the same ring and therefore results in a degradation of end-to-end service.

To overcome this challenge, some carriers can geographically partition their existing SONET/SDH ring networks into small cascaded rings such that the probability of two fiber failures occurring on the same ring is reduced. This helps increase service availability but, in many cases, does not allow the carriers to meet their target availability objective (particularly for high value e.g. banking clients who demand 'always on' service). They are also now investigating the use of mesh restoration to increase their service availability.

A challenge with both ring protection and mesh restoration is the fact that fiber failures are statistically dependent upon the distance between the switching nodes in the network. So, even if mesh restoration is used, if the distance between mesh restoration switch sites is too long, then there still exists an increased probability that a service node can be isolated due to simultaneous failures on each of the (multiple) links connected to that node . . . thus losing service.

One approach used to increase resiliency performance and availability is to combine SDH or SONET ring protection with SONET or SDH mesh restoration. This capability can be combined through a Virtual Line Switched Ring (VLSR) or SNCP protection plus backup mesh restoration on an Optical switch platform. This clearly provides the benefit of a deterministic 50 ms protection time plus mesh restoration availability.

However, this typically needs to be implemented by a single SDH or SONET vendor. Unfortunately, while perhaps possible, the interaction of SDH/SONET between different vendor's equipment for ring protection is highly complicated and not advised. For a number of reasons including Data Communication Channel (DCC) transparency, different use of (and response to) SONET/SDH overhead bytes, etc. very little success has been achieved in the industry in the area of SONET/SDH inter-working between different vendors. Consequently, it does not make engineering or operational sense to operate SDH/SONET rings between mesh restoration nodes belonging to one vendor and SDH/SONET rings belonging to a second vendor. This has been shown to be operationally challenging to engineer.

Also, in some network designs, it may not be cost effective (or prudent from a traffic management perspective) to put a large cross-connect with mesh restoration capabilities at every node in the network. The use of a limited number of cross-connects plus lower cost equipment in between may provide a more economic solution.

BRIEF SUMMARY OF THE INVENTION

In various exemplary embodiments, the present invention provides a directionless (i.e., a direction-independent) optical architecture for reconfigurable optical add/drop multiplexers (ROADMs) and wavelength selective switches (WSSs). The directionless architecture utilizes a wavelength switch coupled between client devices and ROADMs/WSSs to eliminate the need to hard-wire client devices to a wavelength division multiplexed (WDM) network. Accordingly, client device connections can be automatically routed without manual intervention to provide a highly resilient network design which can recover route diversity during failure scenarios. Additionally, the present invention minimizes deployments of costly optical transceivers while providing superior resiliency. Further, the present invention couples the directionless optical architecture and associated optical protection mechanisms with existing mesh restoration schemes to provide additional resiliency. Here, the present invention provides mesh restoration, such as through SONET/SDH, across a G.709/OTN enabled sequence of rings. The G.709 rings provide high availability connectivity for the SONET/SDH connections.

In an exemplary embodiment of the present invention, a directionless optical system includes a client device; a reconfigurable optical node including one or more degrees; and a switch connected to each of the one or more degrees; wherein the client device connects to the switch, and wherein the switch is configured to route signals between the client device and the one or more degrees. Optionally, the directionless optical system further includes a splitter including an input port connected to a transmitter on the client device and dual output ports connected to the switch, wherein the splitter is configured to receive an input from the transmitter on the input port and provide duplicate signals of the input from the transmitter on the dual output ports; and a tail-end switch including dual input ports connected to the switch and an output port connected to a receiver on the client device, wherein the tail-end switch is configured to receive duplicate input signals from the switch on the dual input ports and provide one of the duplicate input signals to the receiver. The switch includes a first switch module and a second switch module for redundancy, and wherein each of the dual output ports and dual input ports connect separately to the first switch module and the second switch module. The one or more degrees can includes two or more degrees; wherein the first switch module and the second switch module are configured to connect the duplicate signals on the dual output ports to separate degrees of the two or more degrees; and wherein the first switch module and the second switch module are configured to connect the duplicate input signals on the dual input ports to separate degrees of the two or more degrees. The two or more degrees can also include an additional degree not utilized by the dual output ports and the dual input ports; and wherein, responsive to a failure on one of the separate degrees, the first switch module and the second switch module are configured to redirect one of the dual output ports and one of the dual input from the one of the separate degrees to the additional degree to provide route diversity.

Alternatively, the directionless optical system further includes a first transceiver and a second transceiver on the client device, wherein the first transceiver and the second transceiver are connected to the switch; wherein the one or more degrees includes two or more degrees; and wherein the switch is configured to connect the first transceiver and the second transceiver to separate degrees of the two or more degrees. The switch can include a first switch module and a second switch module for redundancy, and wherein the first transceiver is connect to the first switch module and the second switch module is connected to the second switch module. The two or more degrees can also include an additional degree not utilized by the first transceiver and the second transceiver; and wherein, responsive to a failure on one of the separate degrees, the first switch module and the second switch module are configured to redirect one of the first transceiver and the second transceiver from the one of the separate degrees to the additional degree to provide route diversity. Optionally, the client device includes a router, and wherein the first transceiver and the second transceiver utilize layer three protection mechanisms. The reconfigurable optical node can include a wavelength selective switch for each of the one or more degrees; and a multi-channel fixed filter including one of a band-wide and cyclic Arrayed Waveguide connected to the wavelength selective switch and the switch.

Optionally, the directionless optical system further includes a regenerator/wavelength converter connected to the switch; wherein the switch is configured to connect a signal from the one or more degrees to the regenerator/wavelength converter. The one or more degrees can include two or more degrees, and wherein the reconfigurable optical node includes a first wavelength selective switch connected to a first set of one or more demultiplexers and to a first set of one or more multiplexers; and a second wavelength selective switch connected to a second set of one or more demultiplexers and to a second set of one or more multiplexers; wherein each of the first set of one or more demultiplexers, the first set of one or more multiplexers, the second set of one or more demultiplexers, and the second set of one or more multiplexers include a connection to the switch. The switch can include two or more optical switches, and wherein the first set of one or more demultiplexers, the first set of one or more multiplexers, the second set of one or more demultiplexers, and the second set of one or more multiplexers are each wavelength independent. Alternatively, the directionless optical system further includes a wavelength division multiplex platform including a transponder, the splitter, and the tail-end switch, wherein the transponder connects to the client device; wherein the client device includes mesh restoration with a hold-off timer configured to allow the splitter and the tail-end switch to restore service prior to initiated mesh restoration.

In another exemplary embodiment of the present invention, a highly available directionless optical method includes providing a first path and a second path through a network between a first device and a second device, wherein the first device and the second device are each dynamically connected to the first path and the second path; upon a failure on the first path, restoring service between the first device and the second device on the second path; and reconfiguring the first path to a third path by dynamically changing a connection from the first path on each of the first device and the second device to the third path. Each of the first path and the second path includes an optical network; wherein dynamically connected includes a directionless optical switch between each of the first path and the second path and each of the first device and the second device. The highly available directionless optical method further includes performing mesh restoration at each of the first device and the second device following a hold-off time period, wherein the hold-off time period is configured to enable service restoration optically between the first device and the second device.

In yet another exemplary embodiment of the present invention, a highly available directionless optical network includes a first device including an optical connection to a first optical switch; a first optical platform connected to the first optical switch, wherein the first optical platform includes multiple degrees; a second device including an optical connection to a second optical switch; a second optical platform connected to the second optical switch, wherein the second optical platform includes multiple degrees; and a plurality of interconnected reconfigurable optical nodes between the first optical platform and the second optical platform; wherein the first optical switch and the second optical switch connect the first optical platform to the second optical platform through a first path and a second path; wherein the first path utilizes a first degree of the multiple degrees on the first optical platform and a first degree of the multiple degrees on the second optical platform; wherein the second path utilizes a second degree of the multiple degrees on the first optical platform and a second degree of the multiple degrees on the second optical platform; and wherein the first optical switch is configured to switch connections from one of the first path and the second path to a third degree of the multiple degrees on the first optical platform and a third degree of the multiple degrees on the second optical platform. Optionally, the plurality of interconnected reconfigurable optical nodes are configured in a cascaded protection ring configuration between the first optical platform and the second optical platform; and wherein the first optical platform and the second optical platform are configured to provide optical 1+1 protection. The first device and the second device can include mesh restoration with a hold-off timer operable to delay mesh restoration for a time period allowing the optical 1+1 protection to reestablish service. The highly available directionless optical network can further include one or more regenerators at one or more of the plurality of interconnected reconfigurable optical nodes; wherein each of the one or more of the plurality of interconnected reconfigurable optical nodes include an optical switch connected between the one or more regenerators and the one or more of the plurality of interconnected reconfigurable optical nodes.

In yet another exemplary embodiment of the present invention, a directionless reconfigurable optical add/drop node includes a wavelength selective switch connected to a multi-channel fixed filter, wherein the multi-channel fixed filter includes one of a band-wide and cyclic Arrayed Waveguide; an optical switch connected to the multi-channel fixed filter; and a client device connected to the optical switch; wherein the wavelength selective is configured to provide single channel selectivity across a plurality of wavelengths; wherein the multi-channel fixed filter receive one of the plurality of wavelengths within a multi-channel range of the multi-channel fixed filter; and wherein the optical switch routes the one of the plurality of wavelengths to the client device.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides a directionless optical architecture for reconfigurable optical add/drop multiplexers (ROADMs) and wavelength selective switches (WSSs). The directionless architecture utilizes a directionless wavelength switch coupled between client devices and ROADMs/WSSs to eliminate the need to hard-wire client devices to a wavelength division multiplexed (WDM) network. Accordingly, client device connections can be automatically routed without manual intervention to provide a highly resilient network design which can recover route diversity during failure scenarios. Additionally, the present invention minimizes deployments of costly optical transceivers while providing superior resiliency. Further, the present invention couples the directionless optical architecture and associated optical protection mechanisms with existing mesh restoration schemes to provide additional resiliency. Here, the present invention provides mesh restoration, such as through SONET/SDH, across a G.709/OTN enabled sequence of rings. The G.709 rings provide high availability connectivity for the SONET/SDH connections.

Advantageously, the present invention can provide connections with high availability between switch or router ports. The present invention can also be utilized with SONET/SDH/ Optical Transport Network (OTN) terminals and the like. As data rates increase to 40 Gbps, 100 Gbps, and the like, the present invention provides the potential for lower cost protection than electronic switching equipment. However, the present invention maintains carrier-grade protection requirements to offer superior resiliency.

Figure 9:
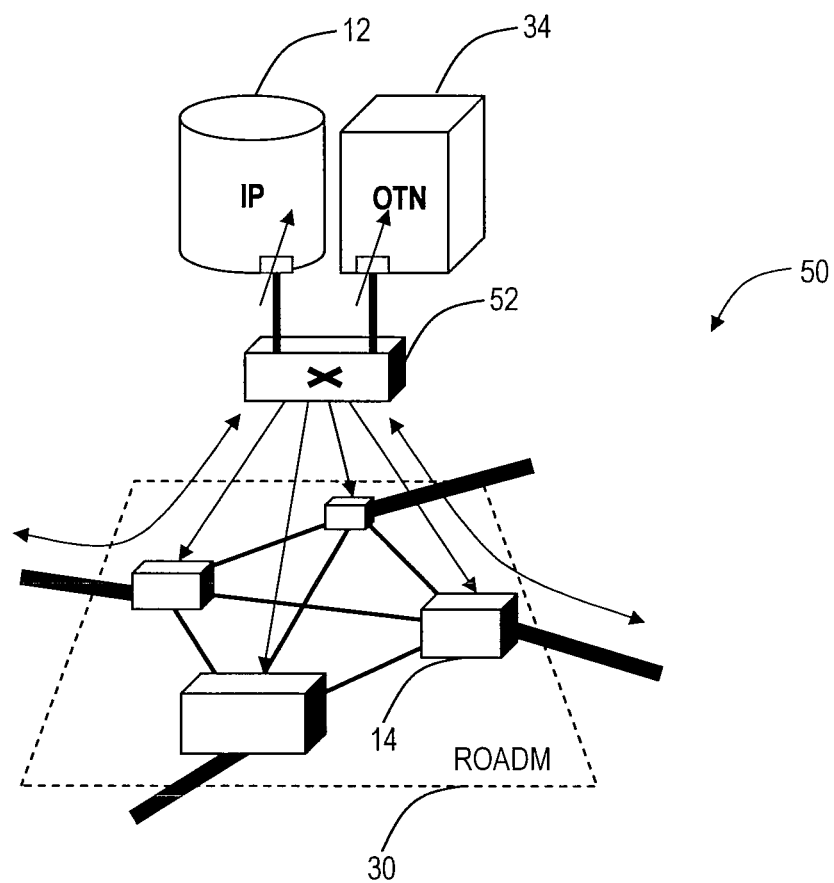
FIG. 9 is a diagram of a directionless architecture with a directionless wavelength switch located between client devices and a ROADM according to an exemplary embodiment of the present invention.

Referring to FIG. 9, a directionless architecture 50 is illustrated with a directionless wavelength switch 52 located between client devices, such as an IP router 12 and an OTN platform 34, and a ROADM 30 according to an exemplary embodiment of the present invention. As described herein, directionless refers to a direction independent architecture where connected ports can be routed to any device or degree through the directionless wavelength switch 52. Advantageously, the directionless wavelength switch 52 effectively removes the hard-wired connection from the devices 12,34 to the ROADM 30 enabling network flexibility in the ROADM 30. In FIG. 9, each of the IP router 12 and OTN platform 34 can select any direction in the ROADM 30 using the wavelength switch 52 to reroute an input/output to/from a different WSS 14.

Connections from the IP router 12 and OTN platform 34 are to the switch 52, i.e. not hard-wired to WSSs 14. The switch 52 provides connections to each WSS 14 in the ROADM 30. Based on the switch 52 configuration, the IP router 12 and OTN platform 34 can have their signals routed in different directions through the ROADM 30 without manual patching of connections.

For example, both the IP router 12 and OTN platform 34 include dual inputs/outputs to the directionless wavelength switch 52 for 1+1/1:1 or the like protection. A failure in the path or on the equipment causes the dual inputs/outputs to switch. The switch 52 can be utilized to switch the failed port to another WSS 14 to provide another route in the network ensuring resiliency during a failure.

The directionless wavelength switch 52 can include a Micro Electro-Mechanical Systems (MEMS), a liquid crystal, an inkjet, a thermal mechanism, a non-linear mechanism, an acousto-optic mechanism, and the like for the physical embodiment. As described herein, the wavelength switch 52 can be scaled to variable port sizes (i.e., depending on application size), and can also include redundancy through multiple physical devices to ensure resiliency. Generally, the directionless wavelength switch 52 is configured to receive an input including one or more wavelengths, and to switch the input to an output port based on provisioning. The directionless wavelength switch 52 can switch at a wavelength level or at a multiplexed wavelength level (i.e., groups of wavelengths). Advantageously, the scaling requirements of the directionless wavelength switch 52 are less than those required for prior art designs that require larger port counts.

Figure 10:
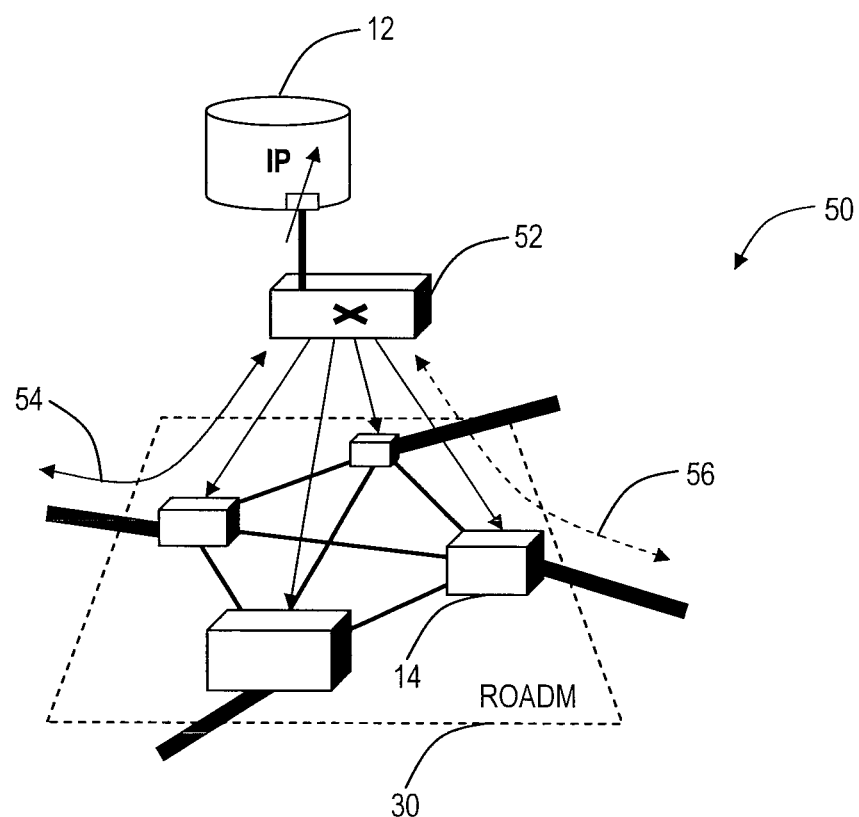
FIG. 10 is a diagram of a directionless architecture with a directionless wavelength switch located between a router and a ROADM to provide optical 1+1 protection from the router according to an exemplary embodiment of the present invention.

Referring to FIG. 10, a directionless architecture 50 is illustrated with a directionless wavelength switch 52 located between an IP router 12 and a ROADM 30 to provide optical 1+1 protection from the IP router 12 according to an exemplary embodiment of the present invention. Here, the router 12 utilizes a single input/output to connect to the switch 52, and the switch 52 can be configured to provide 1:1 optical protection by switching the single input between two diverse paths through the ROADM 30 providing a working 54 and protection 56 path.

Figure 11:
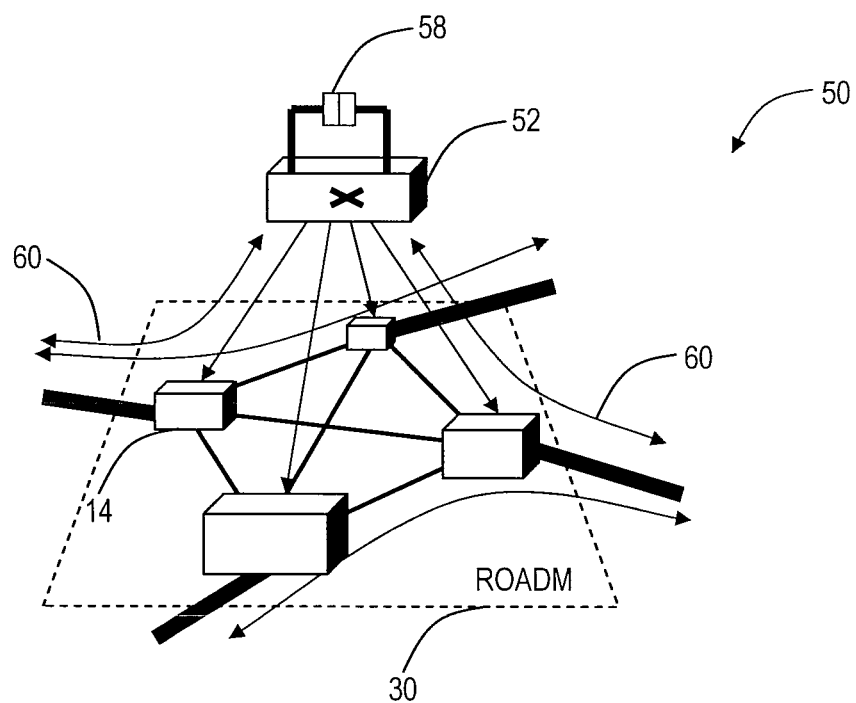

Referring to FIG. 11, a directionless architecture 50 is illustrated with a directionless wavelength switch 52 located between one or more optical regenerators 58 and a ROADM 30 to provide optical regeneration of lightpaths 60 as needed according to an exemplary embodiment of the present invention. The directionless architecture 50 enables any lightpath 60 from client to client to be routed through any arbitrary path through the network. The one or more optical regenerators 58 can be used as needed based on the lightpath 60 routing for optical regeneration or for wavelength conversion (if there is wavelength blocking on a path) based on low optical signal-to-noise ratio (OSNR) or the like. This function will become increasingly of interest as data rates increase and non-regenerated optical transmission distances drop accordingly. Providing access to the dedicated bank of regenerators 58 that are part of the transmission function and not an integral part of a sub-wavelength switch or router will be both efficient and cost effective. Additionally, the bank of regenerators 58 can include wavelength conversion to switch a channel from one wavelength to another. For example, this can include tunable lasers of the regenerators 58.

Figure 12:
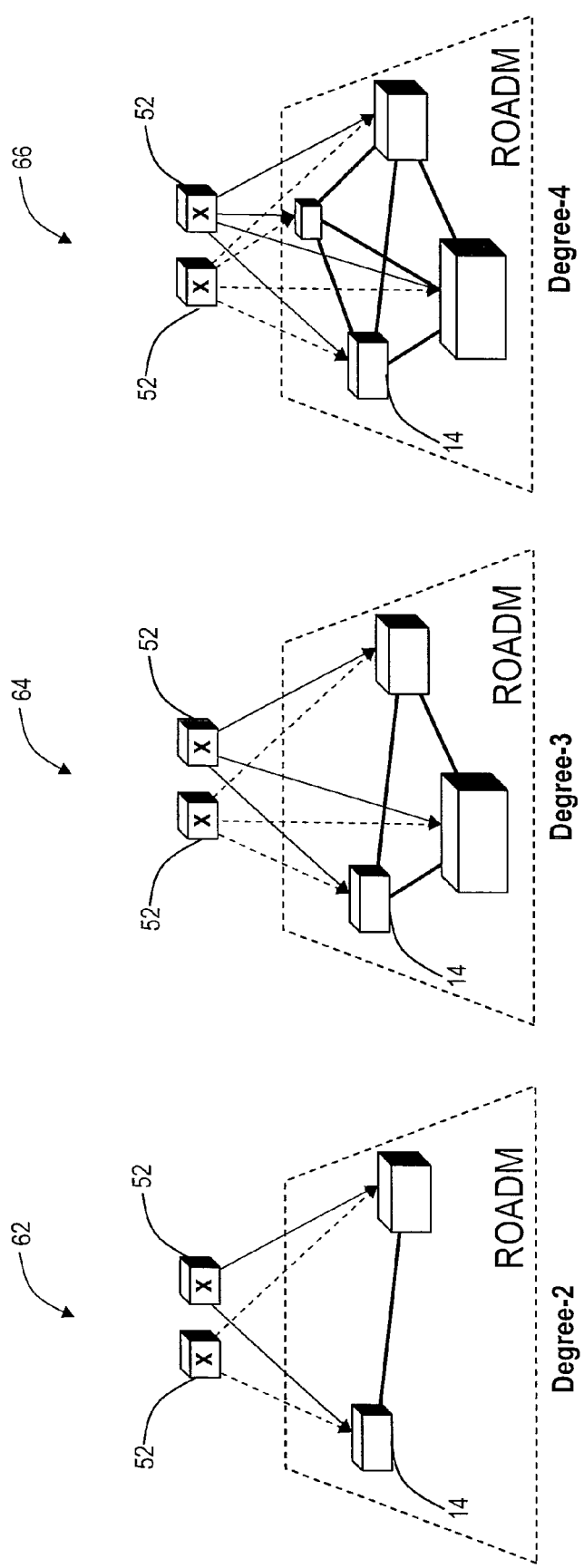
FIG. 12 is a diagram of directionless architectures for ROADMs with redundant directionless switches for multiple degrees according to an exemplary embodiment of the present invention.
Figure 13:
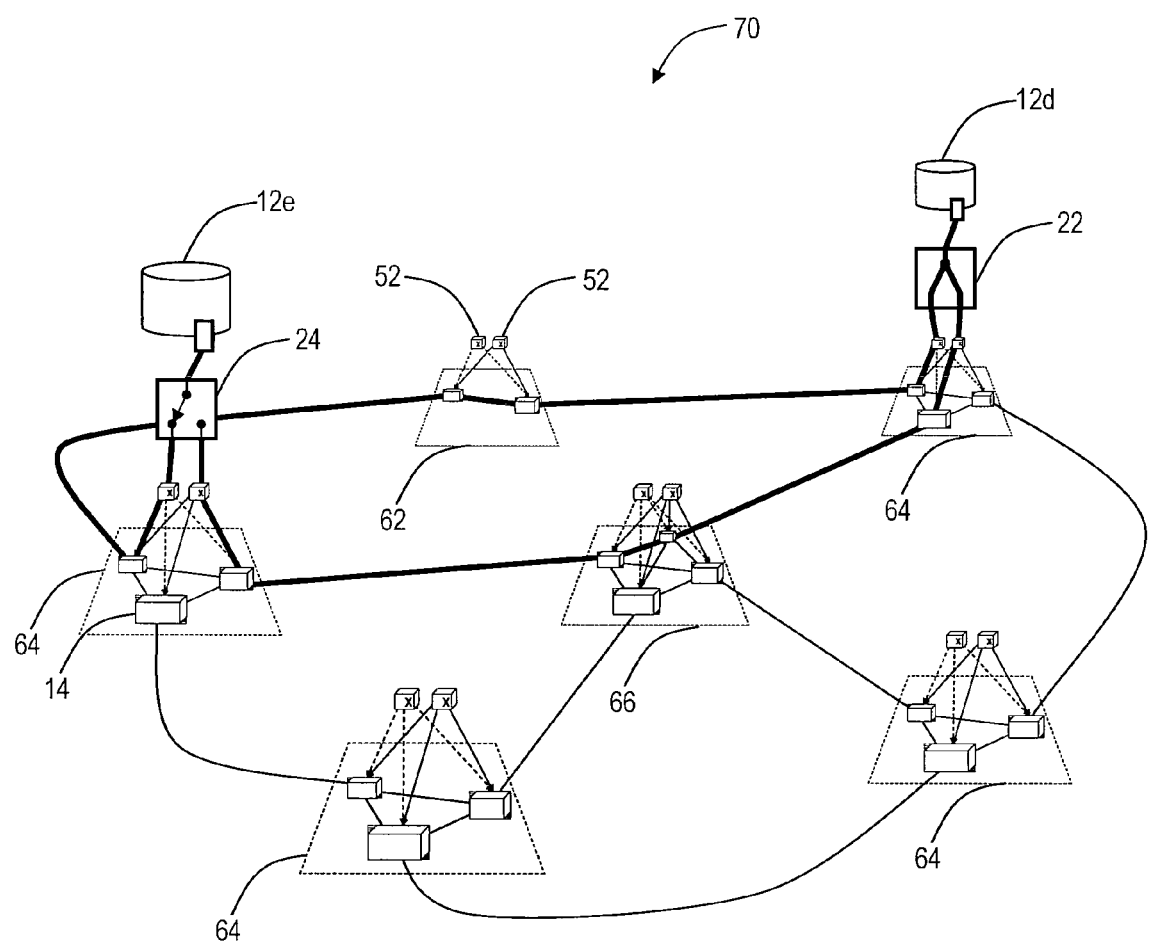
FIGS. 13-16 are diagrams of a network connecting two IP routers with single ports and optical layer protection through ROADMs configured with a directionless architecture according to an exemplary embodiment of the present invention.

Referring to FIG. 12, directionless architectures for a ROADMs 62,64,66 are illustrated with redundant directionless switches 52 for multiple degrees according to an exemplary embodiment of the present invention. For carrier-grade availability reasons, the present invention can use a redundant pair of directionless wavelength switches 52 at each ROADM 62,64,66 location. Each individual directionless switch 52 connects to each WSS 14 associated with each ROADM direction. For example, the WSS 14 can connect to a WDM multiplexer/demultiplexer which is connected to the directionless switch 52. Thus, for a degree-2 ROADM 62, each directionless switch 52 connects to two directions on the WSSs 14. For a degree-3 ROADM 64, each directionless switch 52 connects to three directions on the WSSs 14. For a degree-4 ROADM 66, each directionless switch 52 connects to four directions on the WSSs 14. Note, the present invention can be utilized with any arbitrary number of degrees.

Figure 3:
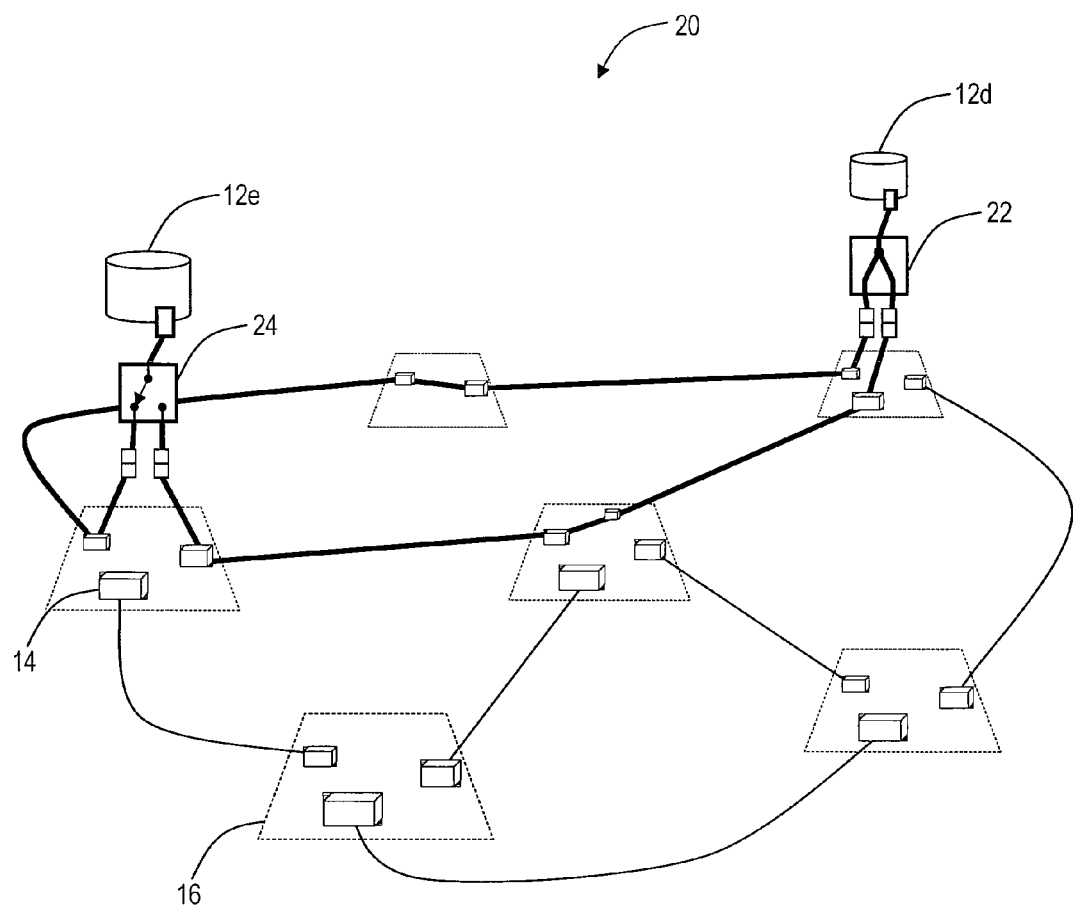
FIGS. 3 and 4 are diagrams of a network of core routers using optical 1+1 broadcast with tail-end protection on optical links between adjacent core routers.
Figure 4:
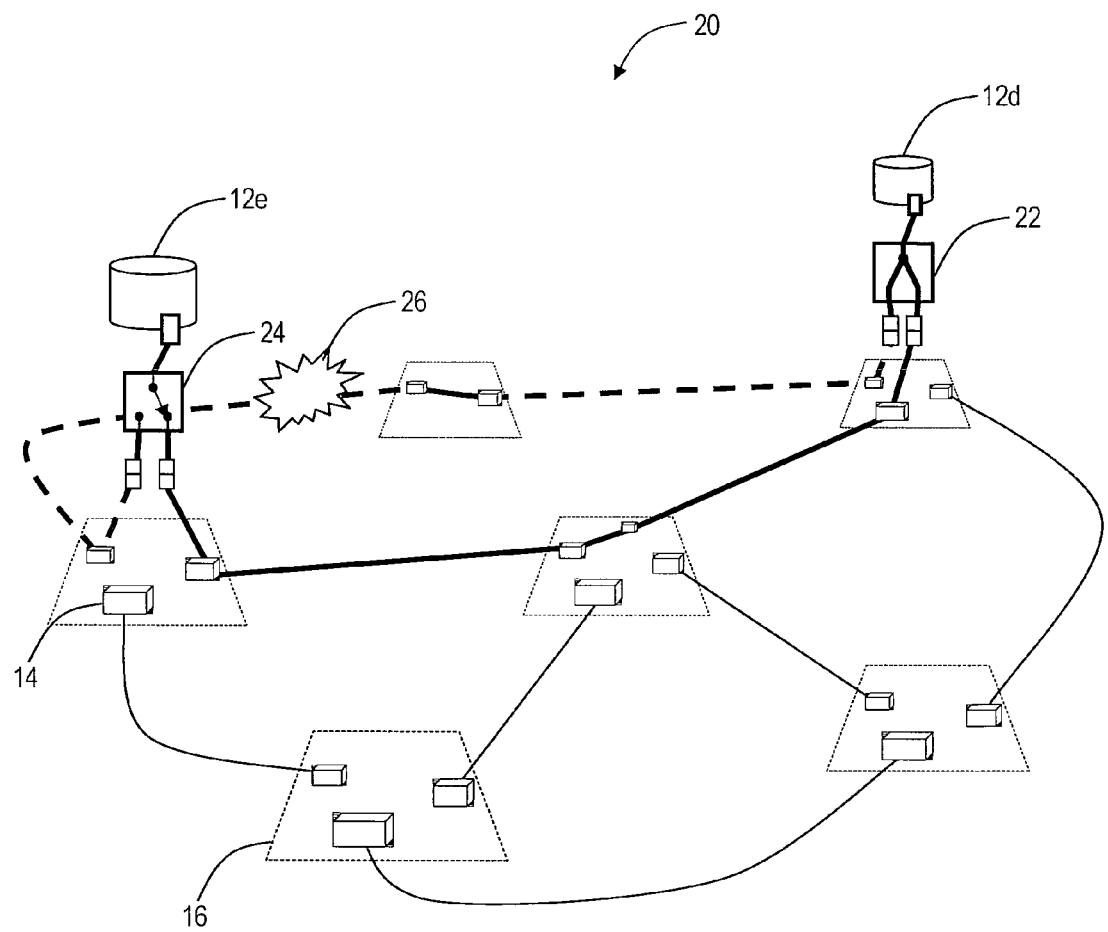
Figure 5:
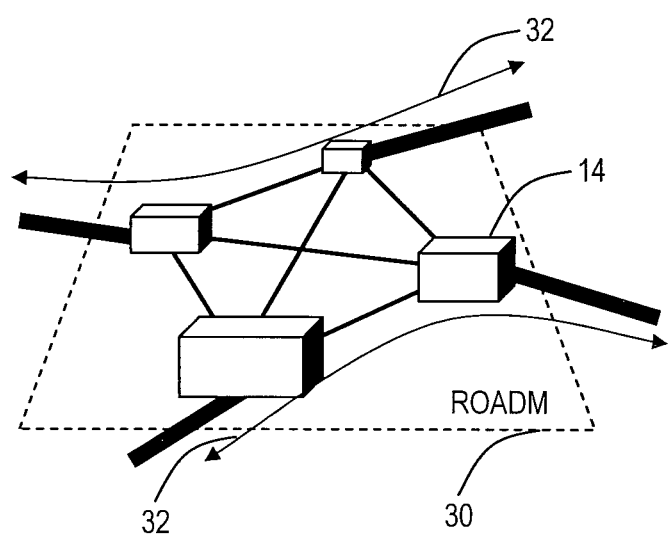
FIGS. 5 and 6 are diagrams of conventional Reconfigurable Optical Add-Drop Multiplexer (ROADM) with Wavelength Selective Switch (WSS) technology.
Figure 6:
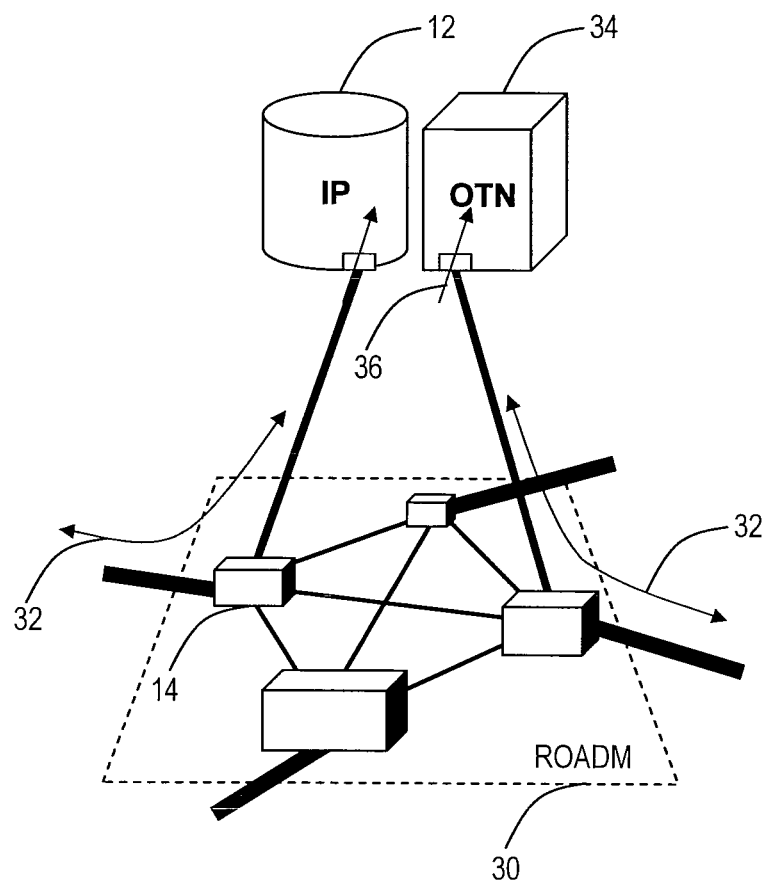
Figure 7:
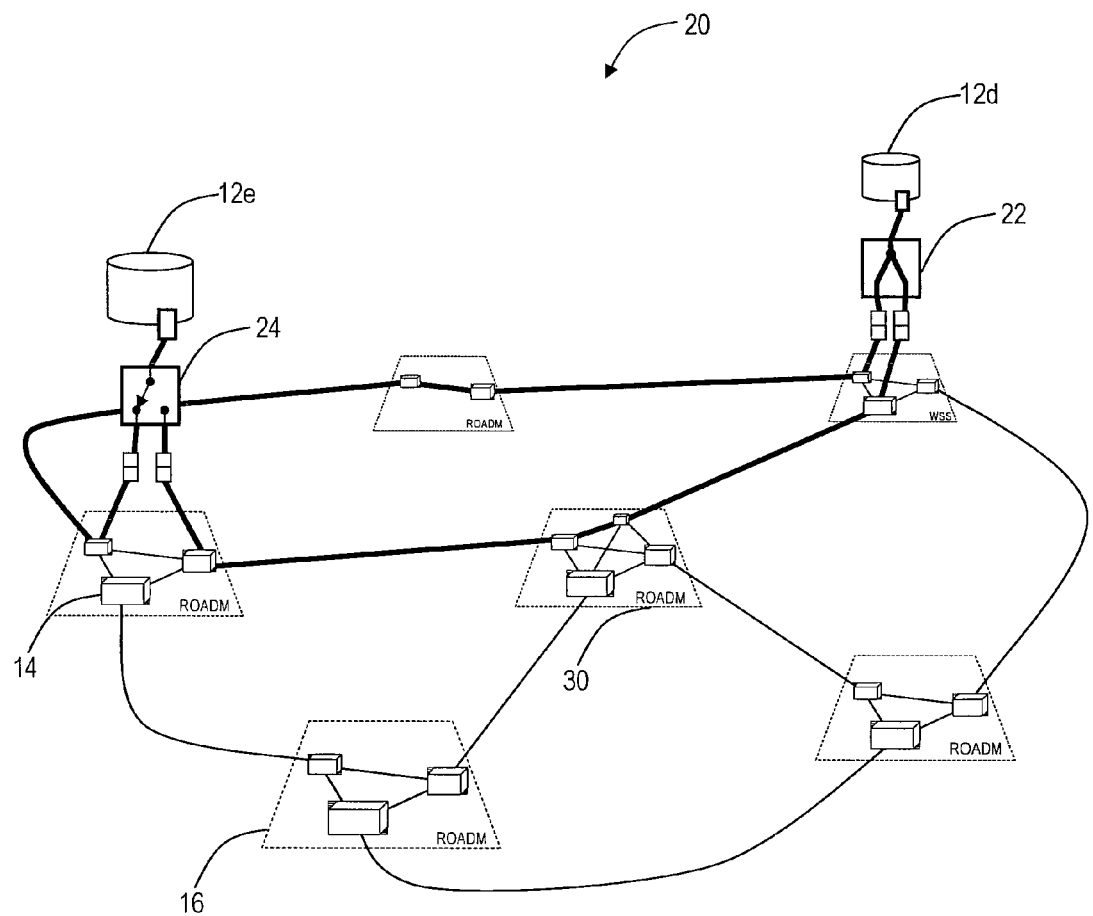
FIG. 7 is a diagram of the network in FIGS. 3 and 4 with conventional ROADM nodes are added at intermediate junction nodes.
Figure 8:
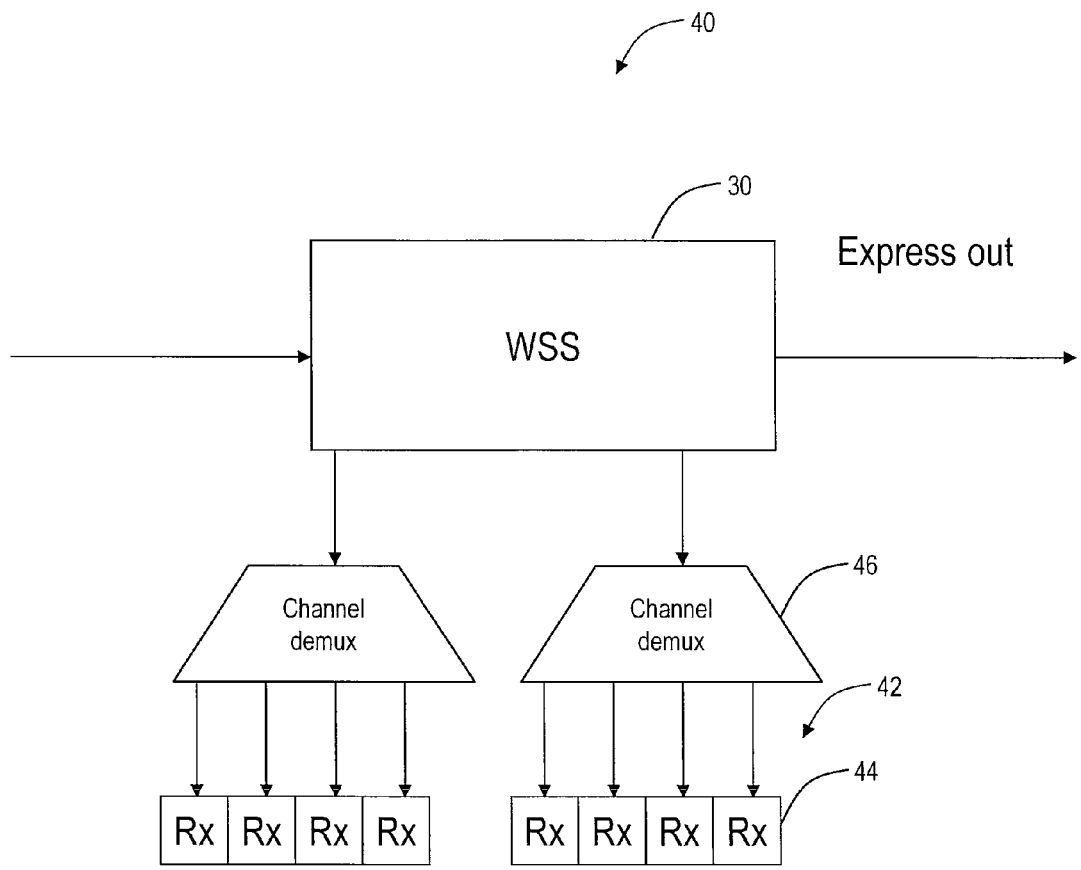
FIG. 8 is a diagram of a conventional ROADM illustrating the limitations associated with current directional architectures.

Referring to FIGS. 13-16, a network 70 includes two IP routers 12d,12e connected through ROADMs 62,64,66 configured with a directionless architecture according to an exemplary embodiment of the present invention. The network 70 is similar to the network 20 in FIGS. 3-4 and 7, but includes the directionless architecture of the present invention with redundant directionless switches 52 at each ROADM 62,64, 66 site.

In this example, the routers 12d,12e are connected through a single optical transceiver on each router 12d,12e. For illustration purposes, a unidirectional path is shown from the router 12d to the router 12e. At the router 12d, an optical splitter 22 is configured to split an output from a transceiver on the router 12d into two identical signals with each signal separately provided to redundant switches 52 at a ROADM 64 node. The redundant switches are connected to each of three WSS 14 at the ROADM 64 node. At the router 12e, a tail end switch 24 is configured to receive outputs from redundant switches 52 connected to three different WSSs 14 at a ROADM 64 node. The switch 24 is configured to switch between the redundant switches 52 responsive to a condition, such as loss of signal.

Figure 14:
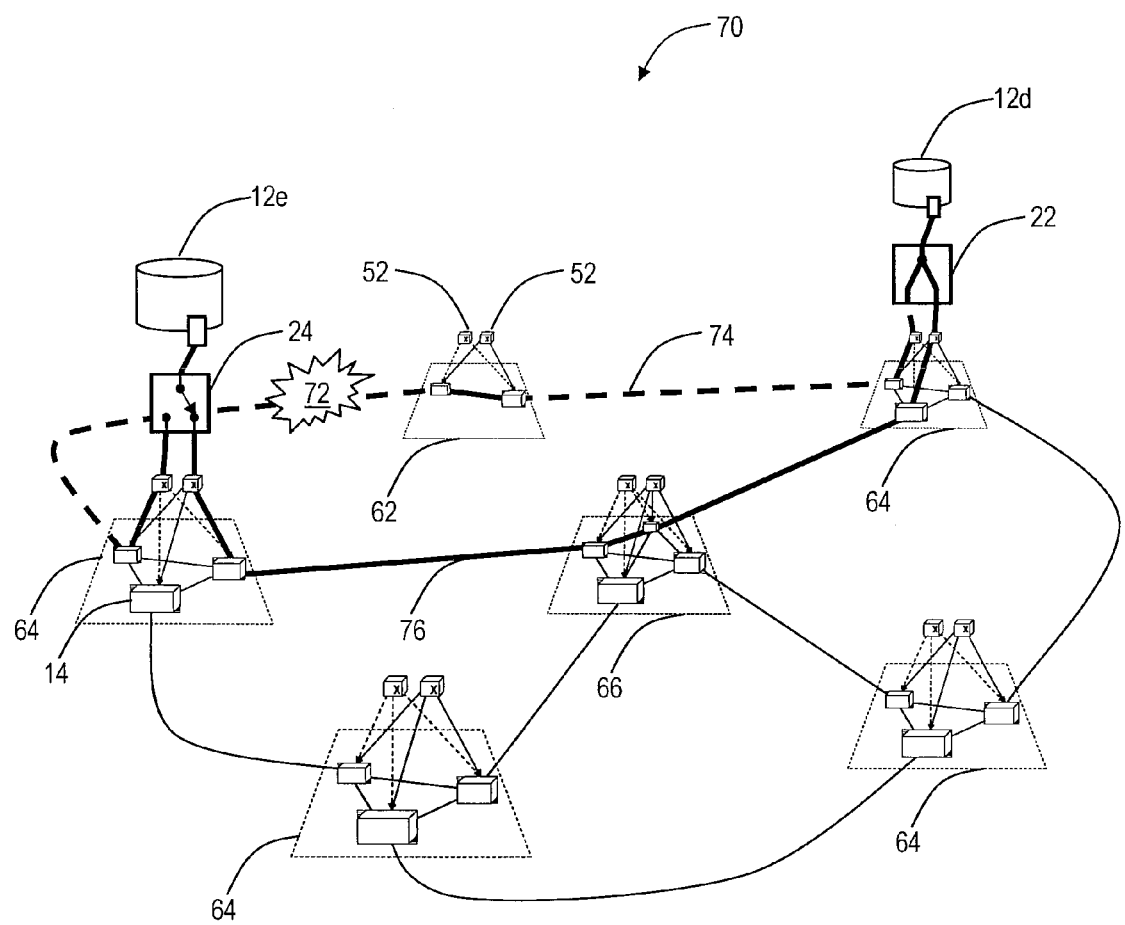
Figure 15:
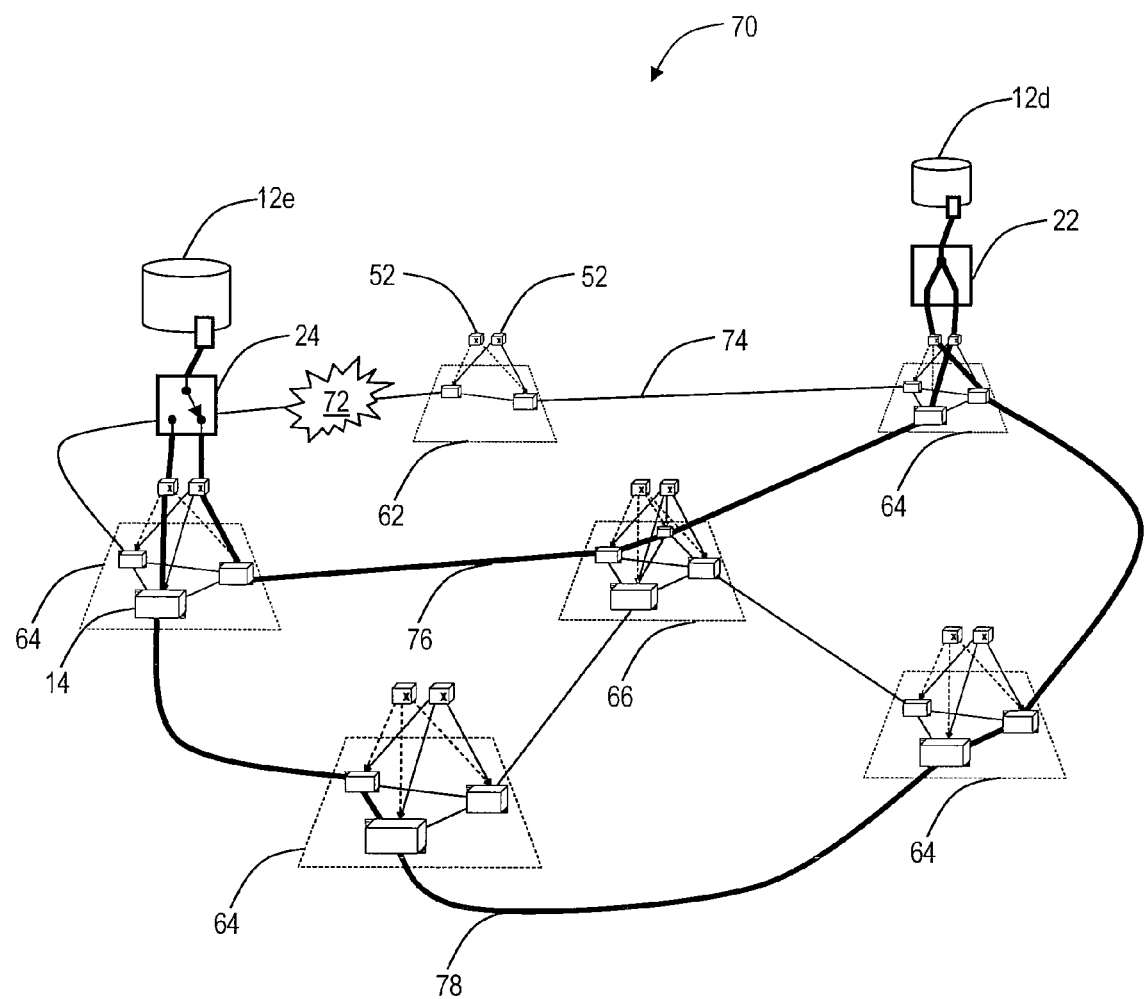
Figure 16:
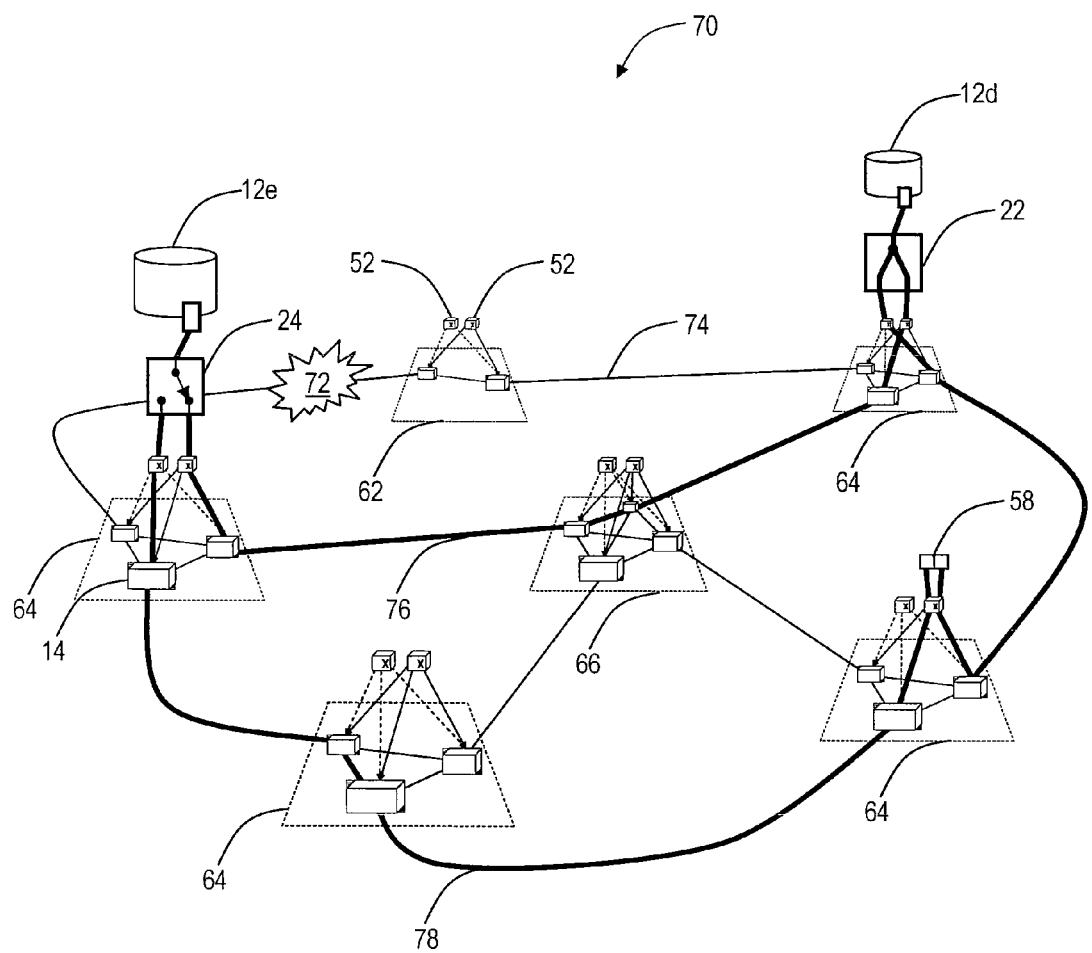

Advantageously, introducing the directionless wavelength switch 52 functionality on top of a WSS layer provides the opportunity to achieve high availability connectivity as is illustrated in the network 70 through an exemplary fault condition 72 in FIGS. 14-16. As illustrated in this example with the splitter 22 and tail end switch 24 for layer one optical tail-end protection, connecting over a WSS layer is a flexible extension to what some carriers are already doing today over static WDM links. Each path of a 1+1 broadcasted router signal is switched through each of the redundant directionless wavelength switches 52 and forwarded to separate directions out of the ROADM node 64.

Note that, in this case, the expensive WDM interface associated with the very high speed router connections is integrated into the core router 12d,12e device and that no other costly very high speed interfaces exist in the path. For example, the core router 12d,12e can include WDM interfaces, and the core router 12d,12e can alternatively include short-reach interconnects to a WDM transceiver. Again, upon link failure, rapid 'tail-end' protection switching (with the switch 24) provides fast optical layer protection without the need for router 12e reconfiguration. Additionally, the network 70 can provide an alternative 'third' path in the network, the direction-less switch 52 associated with the now failed link can reconfigure to create a new backup path.

In FIG. 14, the network 70 is illustrated after the fault condition 72 is experience on a working route 74. Accordingly, the tail end switch 24 is configured to switch to a protect route 76 to receive a protect signal transmitted by the splitter 22 on a diverse path. Here, the working path 74 is now down, and the network 70 is running unprotected only on the protect route 76.

In FIG. 15, the network 70 is illustrated with a third alternative route 78 between the routers 12d,12e. Accordingly, the network 70 can now provide connection diversity between the routers 12d,12e even though the original working route 74 is down. Here, the directionless wavelength switch 52 can be configured to route the lines from the working route 74 to the third alternative route 78. This is done automatically at the switches 52 without the need for manual patching of connections since there is no hard-wired connection from the routers 12d,12e to the WSSs 14. Further, because the new path 78 re-forms the 1+1 broadcast connection between the head-end splitter 22 and tail-end protection switch 24, rapid optical protection capability is regained. Thus, upon a second failure, a sub-50 ms protection switch is guaranteed.

In FIG. 16, the network 70 is illustrated with regenerators 58 at a WSS 64 node on the third alternative route 78. This illustrates the functionality depicted in FIG. 11. Here, on the third alternative route 78, a ROADM node 64 is configured to route the third alternative route 78 to a regenerator 58. Regeneration may be required on a long optical link, or wavelength conversion if the wavelength on route 78 is being used on a particular span. At a ROADM node 64, the directionless wavelength switch 58 provides flexible access to a pool of optical regenerators 58 when necessary. Note, the regenerators 58 may include tunable wavelength transmitters allowing any wavelength to be utilized. Tunable wavelength transmitters are configured to set a center wavelength of a transmitted signal to any particular value within a set range.

Referring to FIGS. 17-20, a network 80 includes two IP routers 12a,12b configured through ROADMs 62,64,66 configured with a directionless architecture according to an exemplary embodiment of the present invention. The network 80 includes the directionless architecture of the present invention with redundant directionless switches 52 at each ROADM 62,64,66 site.

Not all carriers choose to implement optical layer protection between adjacent core router ports, such as in FIGS. 13-16. As described earlier, when failures occur, the IP layer reorganizes IP flows using techniques such as IP/MPLS (Multi-Protocol Label Switching) Fast Re-route. FIGS. 17-20 show the same core router connectivity as described earlier for the static WDM scenario but with a flexible WSS photonic layer. However, as in the previous example, expensive WDM interfaces may be integrated into the core routers to reduce transmission costs.

Figure 17:
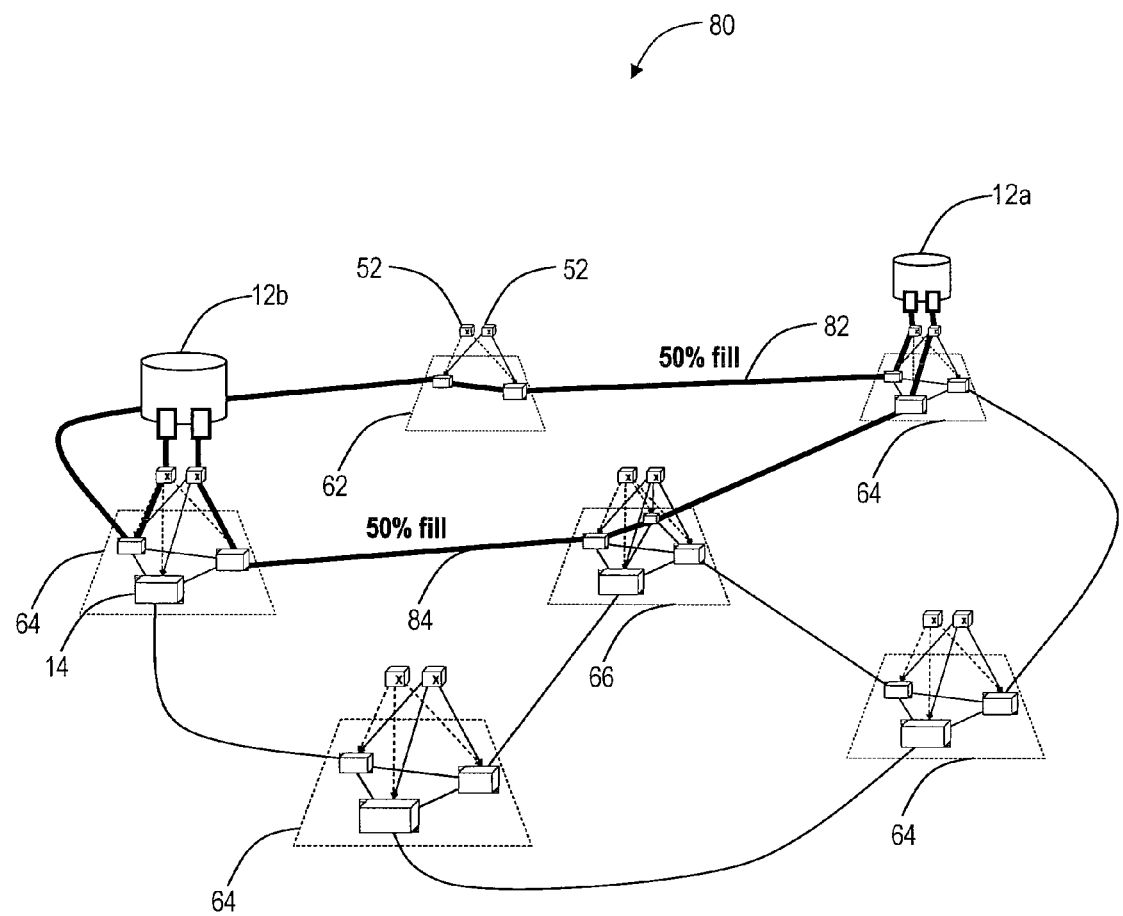
FIGS. 17-20 are diagrams of a network connecting two IP routers with dual ports through ROADMs configured with a directionless architecture according to an exemplary embodiment of the present invention.
Figure 18:
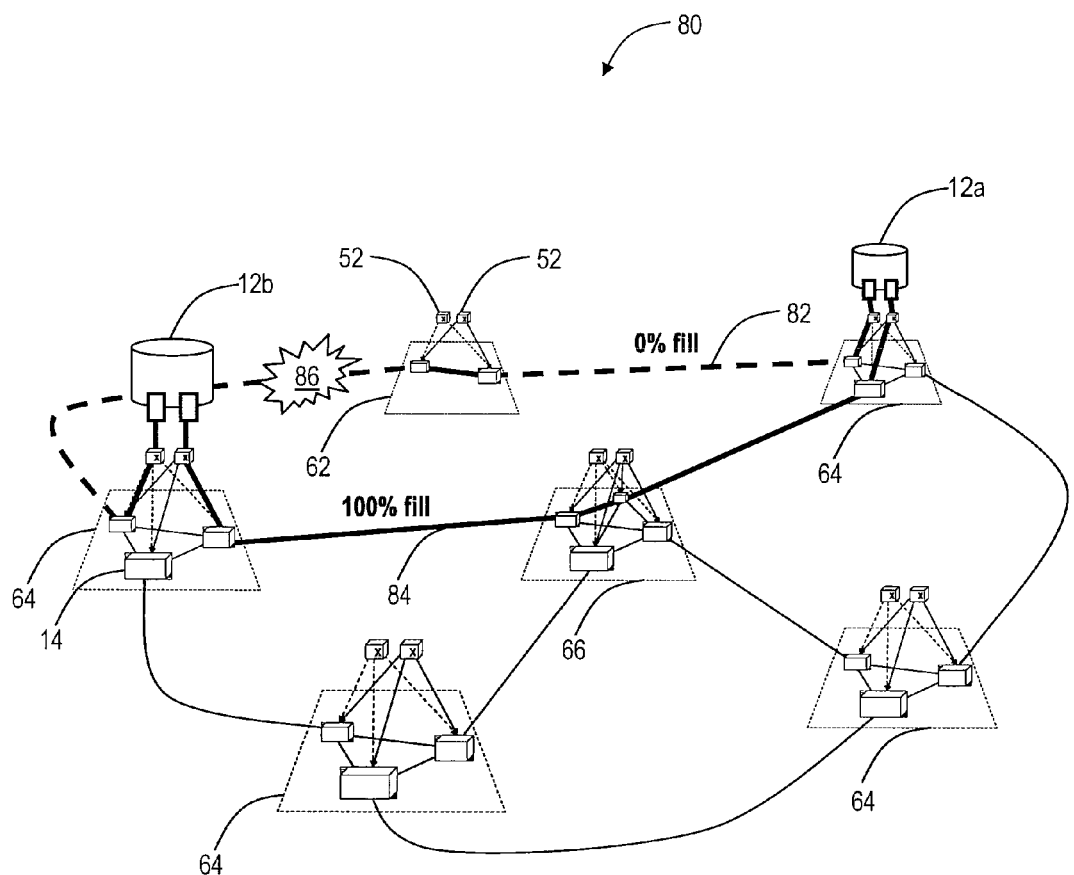

In FIG. 17, each router 12a, 12b includes two optical transceivers connected to the redundant directionless switches 52. At the router 12a,12b, the optical transceivers can be configured to each provide working traffic with a fill rate of around 50%. The unused capacity can be used for layer three rerouting between the routers 12a,12b if a link 82,84 is down. In FIG. 18, the network 80 is illustrated after a fault condition 86 is experience on the link 82. Accordingly, each router 12a,12b is configured to utilize layer three mechanisms to reroute the 50% fill traffic from link 82 onto link 84. Here, the link 82 is now down, and the network 80 is running unprotected with 100% fill on the link 84.

Figure 19:
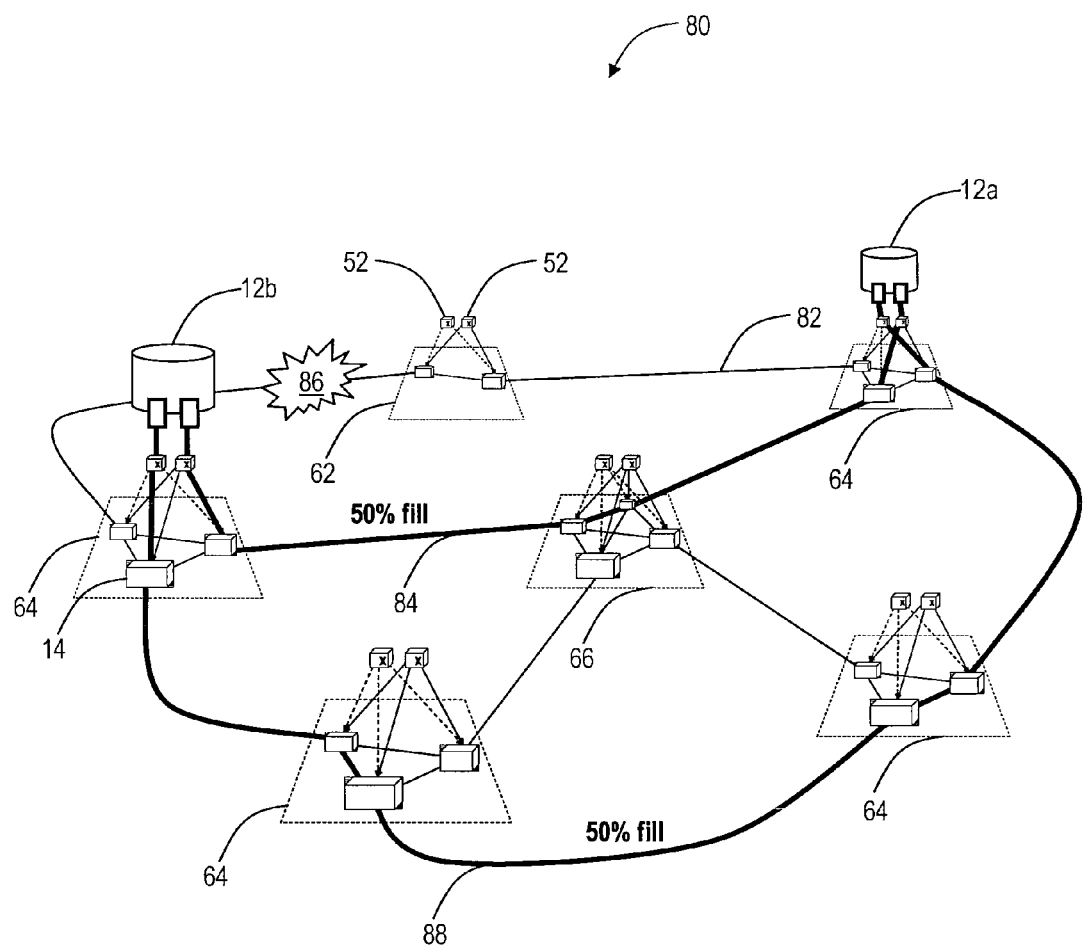

In FIG. 19, the network 80 is illustrated with a third link 88 between the routers 12a,12b. Accordingly, the network 80 can now provide connection diversity between the routers 12*a*,12*b* even though the first link 82 is down. Here, the directionless wavelength switch 52 can be configured to route the lines from the link 82 to the third link 88. This is done automatically at the switches 52 without the need for manual patching of connections since there is no hard-wired connection from the routers 12*a*,12*b* to the WSSs 14. The link 88 can now be provisioned as a working link and approximately 50% of the traffic from link 84 can be moved to link 88 providing excess capacity on a diverse link for protection.

Figure 20:
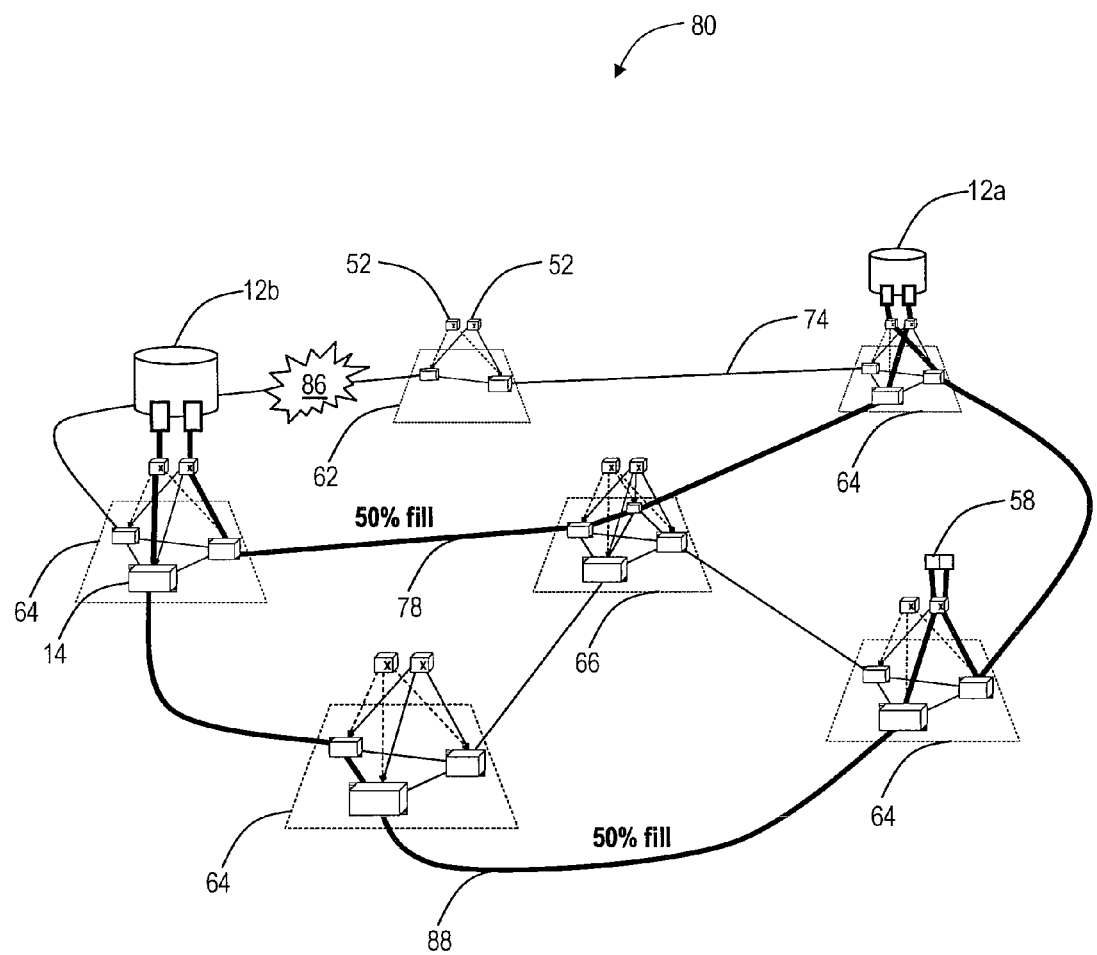

In FIG. 20, the network 80 is illustrated with regenerators 58 at a WSS 64 node on the third link 88. This illustrates the functionality depicted in FIG. 11. Here, on the third link 88, a ROADM node 64 is configured to route the third link 88 to a regenerator 58. Regeneration may be required on a long optical link, or wavelength conversion if the wavelength on link 88 is being used on a particular span. At a WSS node 64, the directionless wavelength switch 58 provides flexible access to a pool of optical regenerators 58 when necessary. Note, the regenerators 58 may include tunable wavelength transmitters allowing any wavelength to be utilized. Tunable wavelength transmitters are configured to set a center wavelength of a transmitted signal to any particular value within a set range.

Figure 1:
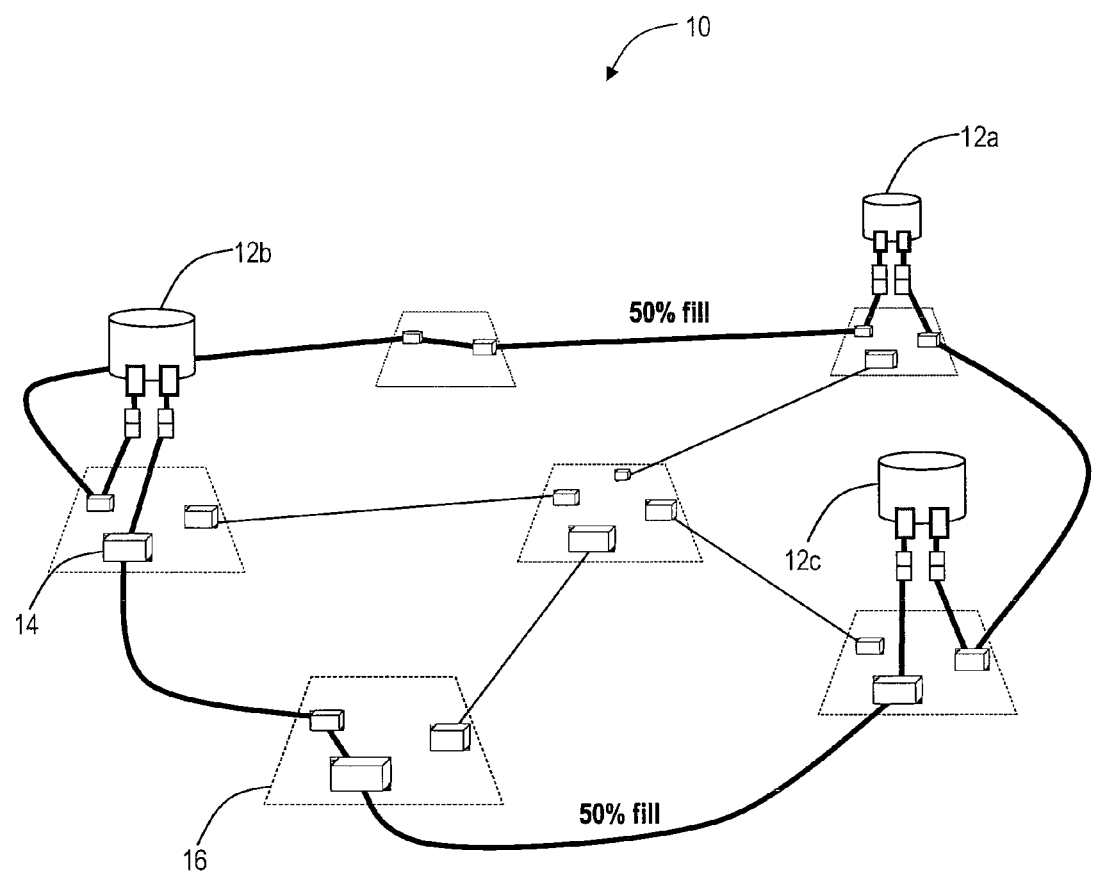
FIGS. 1 and 2 are diagrams of a network of core routers with mesh connections directly over a statically provisioned wavelength division multiplexed (WDM) transport layer.
Figure 2:
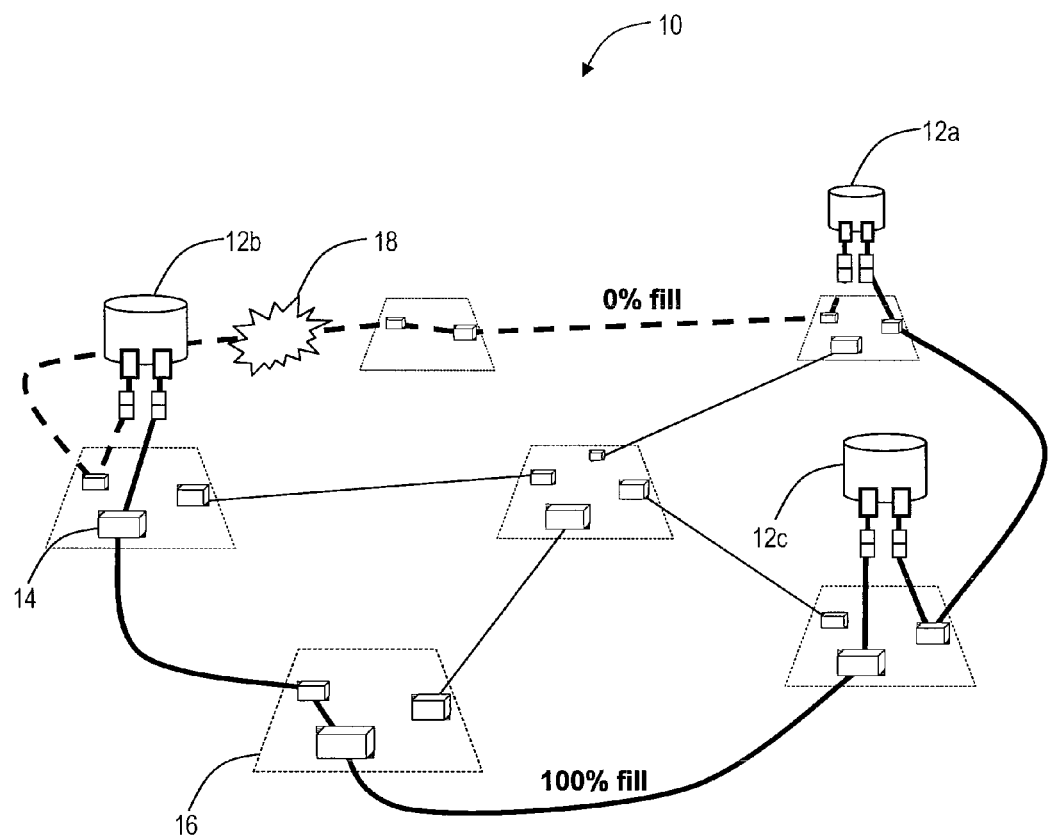

Referring to FIGS. 21-24, a network 90 includes three IP routers 12*a*,12*b*,12*c* configured through ROADMs 62, 64,66 configured with a directionless architecture according to an exemplary embodiment of the present invention. The network 90 is similar to the network 10 in FIGS. 1-2, but includes the directionless architecture of the present invention with redundant directionless switches 52 at each site 62,64,66. As described herein, the network 90 utilizes IP layer protection to reorganize IP flows using techniques such as IP/MPLS Fast Re-route. As such, links 92,94 between routers 12*a*,12*b*,12*c* are provisioned with approximately 50% fill.

Figure 21:
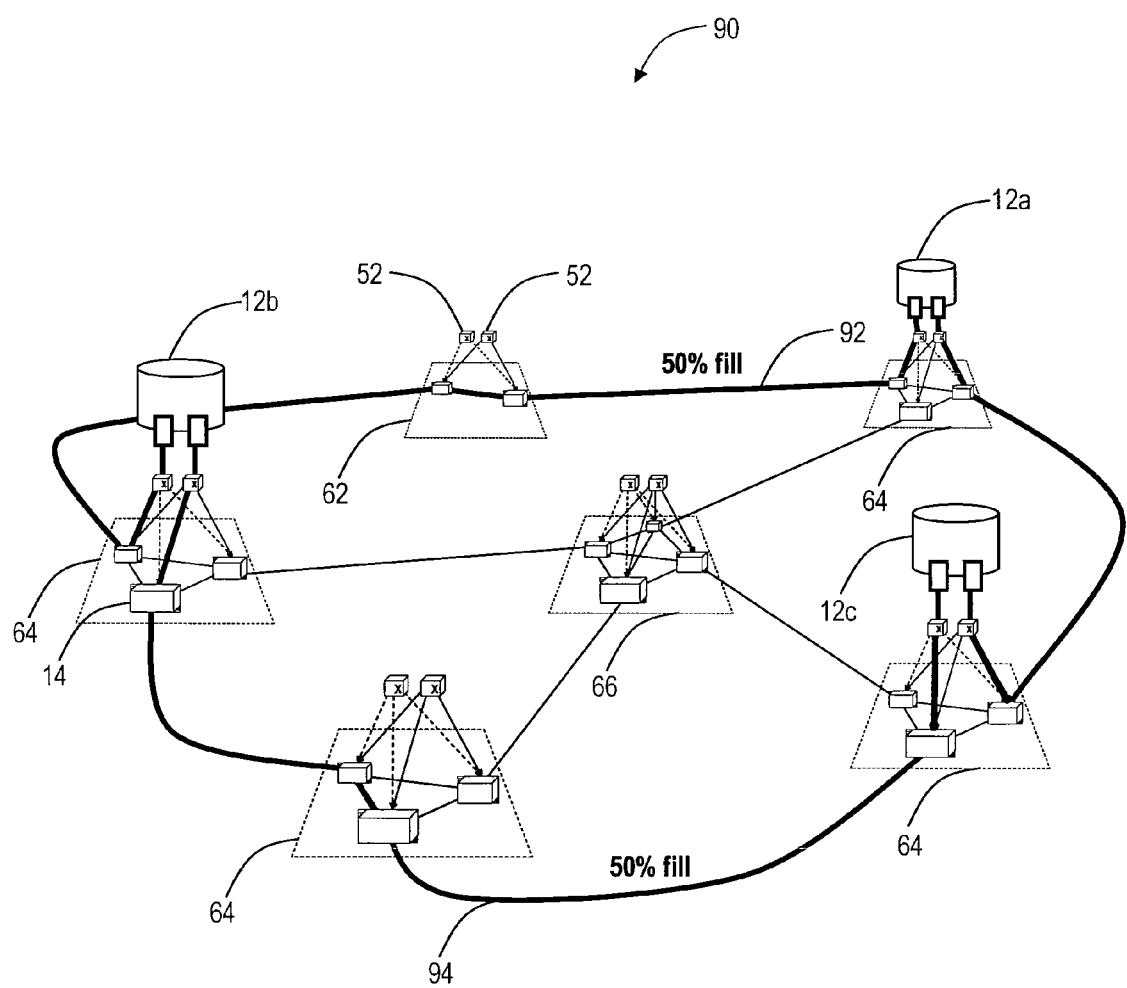
FIGS. 21-24 are diagrams of a network connecting three IP routers with dual ports through ROADMs configured with a directionless architecture according to an exemplary embodiment of the present invention.
Figure 22:
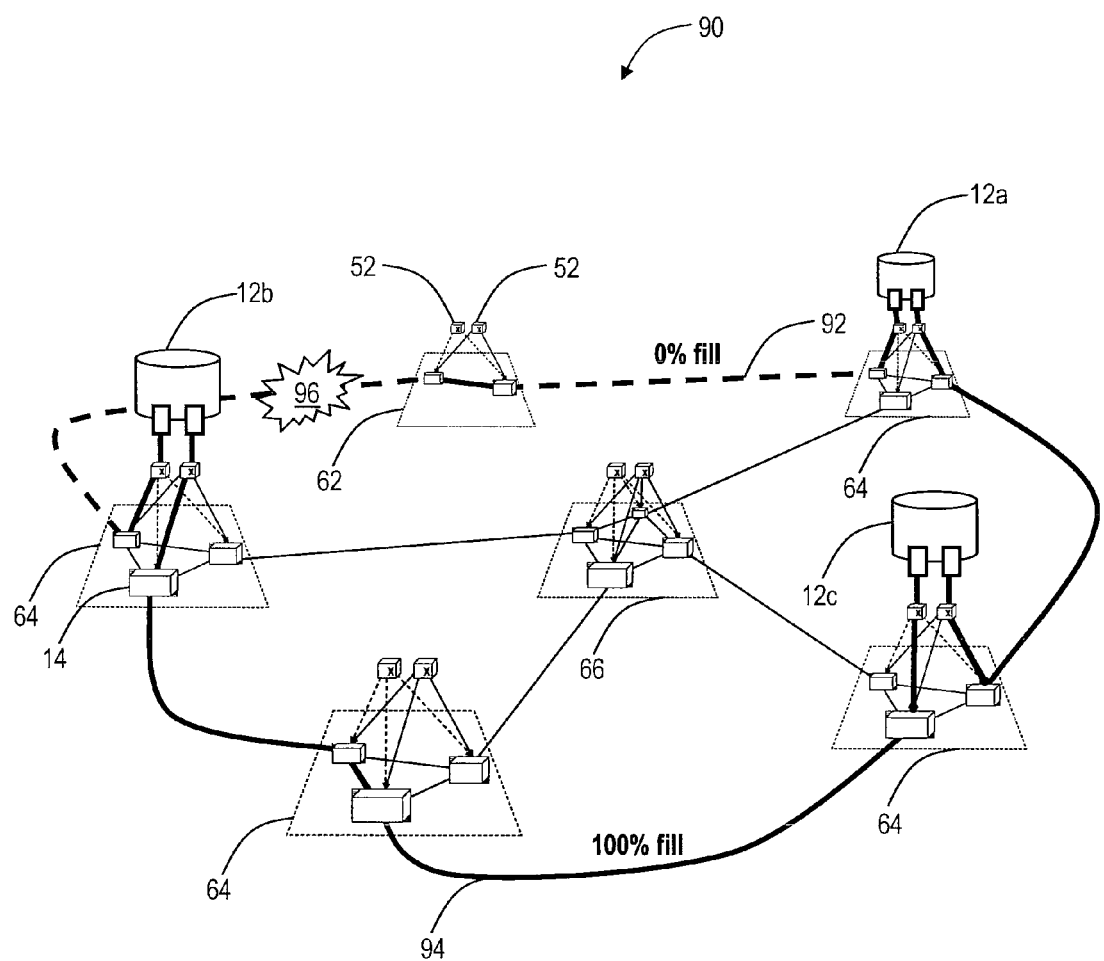

In FIG. 21, each router 12*a*,12*b*,12*c* includes two optical transceivers connected to the redundant directionless switches 52. The switches 52 are configured to direct signals from the two optical transceivers to different WSSs 14. At the router 12*a*,12*b*,12*c* the optical transceivers can be configured to each provide working traffic with a fill rate of around 50%. The unused capacity can be used for layer three rerouting between the routers 12*a*,12*b*,12*c* if a link 92,94 is down. In FIG. 22, the network 90 is illustrated after a fault condition 96 is experience on the link 92. Accordingly, each router 12*a*,12*b* is configured to utilize layer three mechanisms to reroute the 50% fill traffic from link 92 onto link 94. Here, the link 92 is now down, and the network 90 is running unprotected with 100% fill on the link 94.

Figure 23:
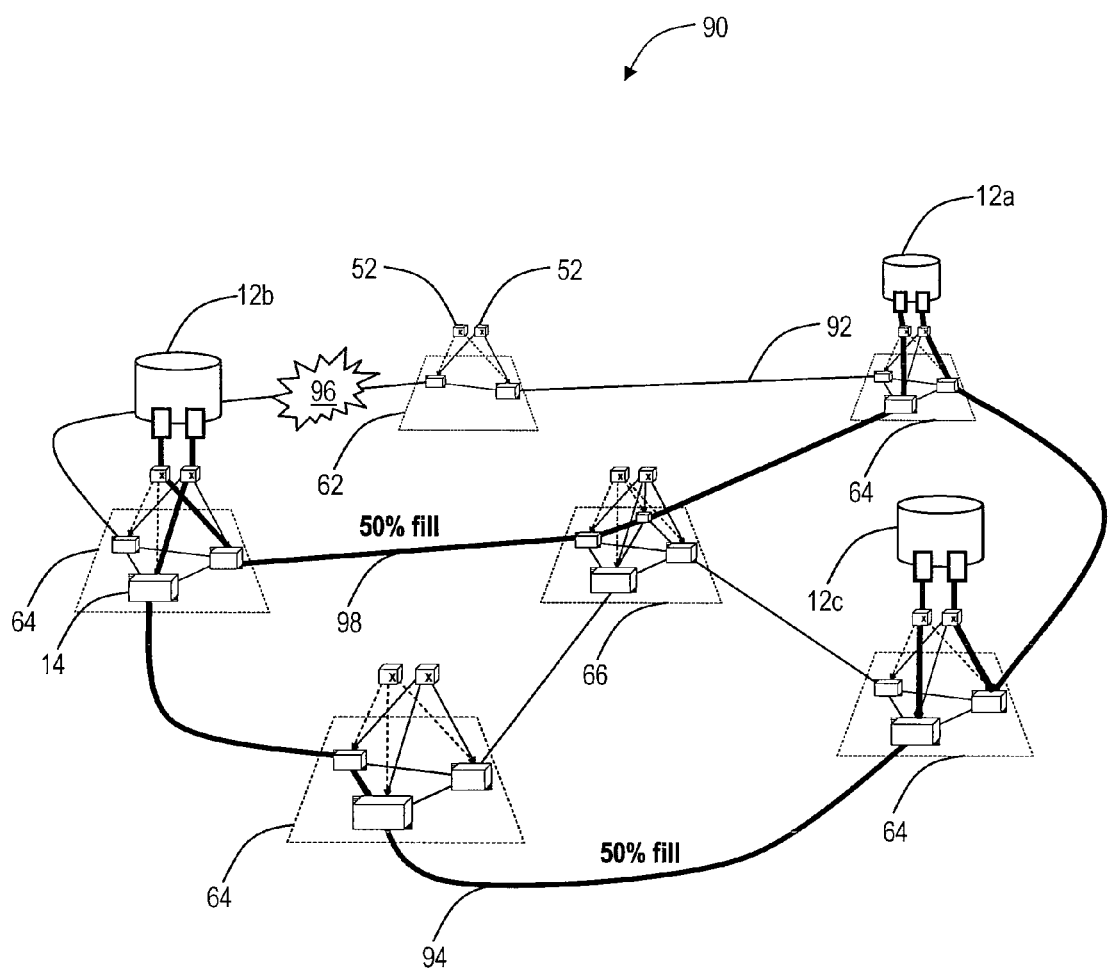

In FIG. 23, the network 90 is illustrated with a third link 98 between the routers 12*a*,12*b*. Accordingly, the network 90 can now provide connection diversity between the routers 12*a*, 12*b* even though the first link 92 is down. Here, the directionless wavelength switch 52 can be configured to route the lines from the link 92 to the third link 98. This is done automatically at the switches 52 without the need for manual patching of connections since there is no hard-wired connection from the routers 12*a*,12*b* to the WSS 14. The link 98 can now be provisioned as a working link and approximately 50% of the traffic from link 94 can be moved to link 98 providing excess capacity on a diverse link for protection.

Figure 24:
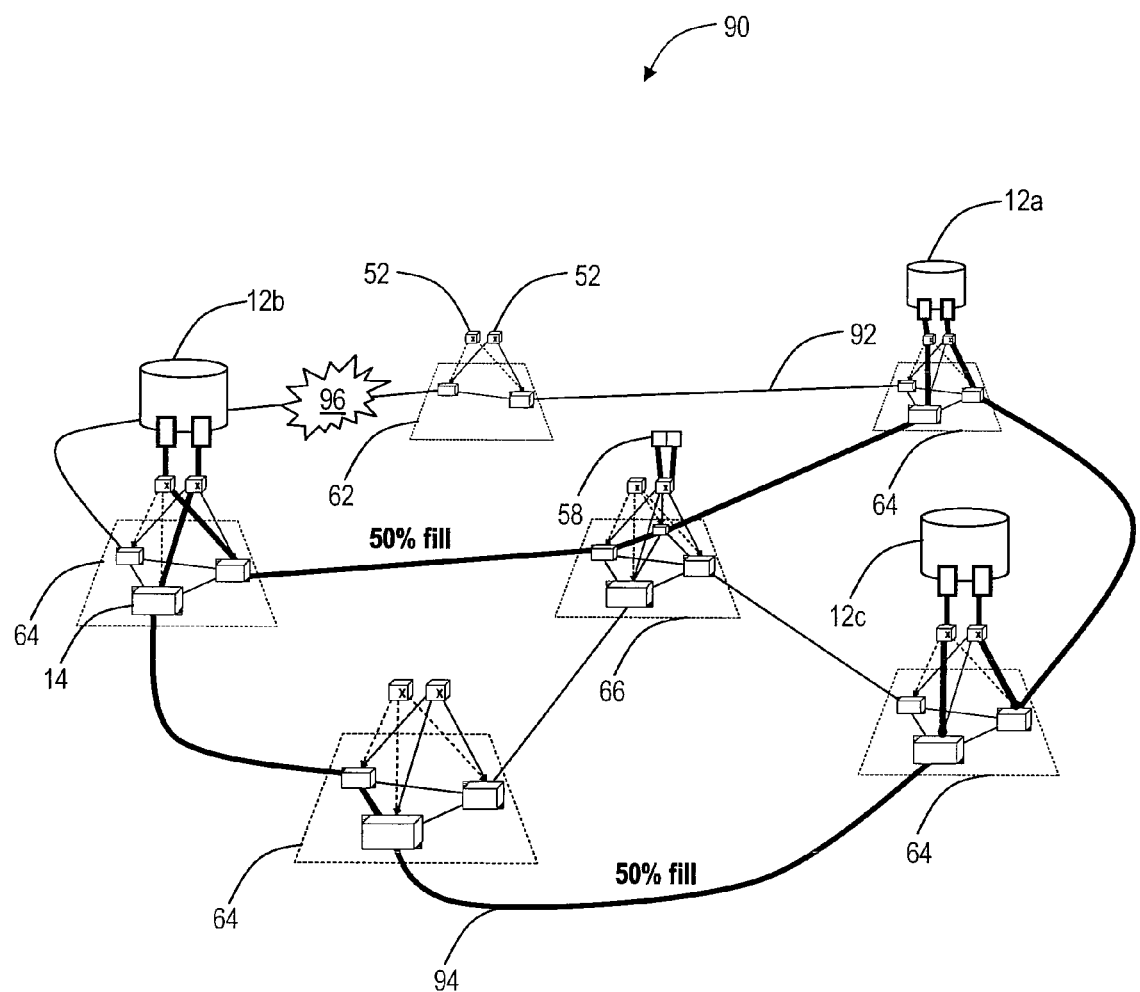

In FIG. 24, the network 80 is illustrated with regenerators 58 at a ROADM 66 node on the third link 98. This illustrates the functionality depicted in FIG. 11. Here, on the third link 98, a ROADM node 66 is configured to route the third link 98 to a regenerator 58. Regeneration may be required on a long optical link, or wavelength conversion if the wavelength on link 98 is being used on a particular span. At a ROADM node 66, the directionless wavelength switch 58 provides flexible access to a pool of optical regenerators 58 when necessary. Note, the regenerators 58 may include tunable wavelength transmitters allowing any wavelength to be utilized. Tunable wavelength transmitters are configured to set a center wavelength of a transmitted signal to any particular value within a set range.

Referring to FIGS. 25-29, a high availability router interconnect 100 is illustrated with two routers 12*f*,12*g* interconnected over an optical network 102 utilizing a directionless architecture according to an exemplary embodiment of the present invention. FIGS. 25-29 provide a different schematic view of the same functionality described herein in previous diagrams, focusing at interconnections at each node. The interconnect 100 includes a degree three ROADM node 64 and a degree four ROADM node 66, such as described in FIG. 12. Each ROADM node 64,66 includes multiple WSSs 14 which can connect to WDM multiplexers, demultiplexers, optical amplifiers, DCMs, and the like. A redundant directionless switch 52 is included before each ROADM node 64,66.

Figure 25:
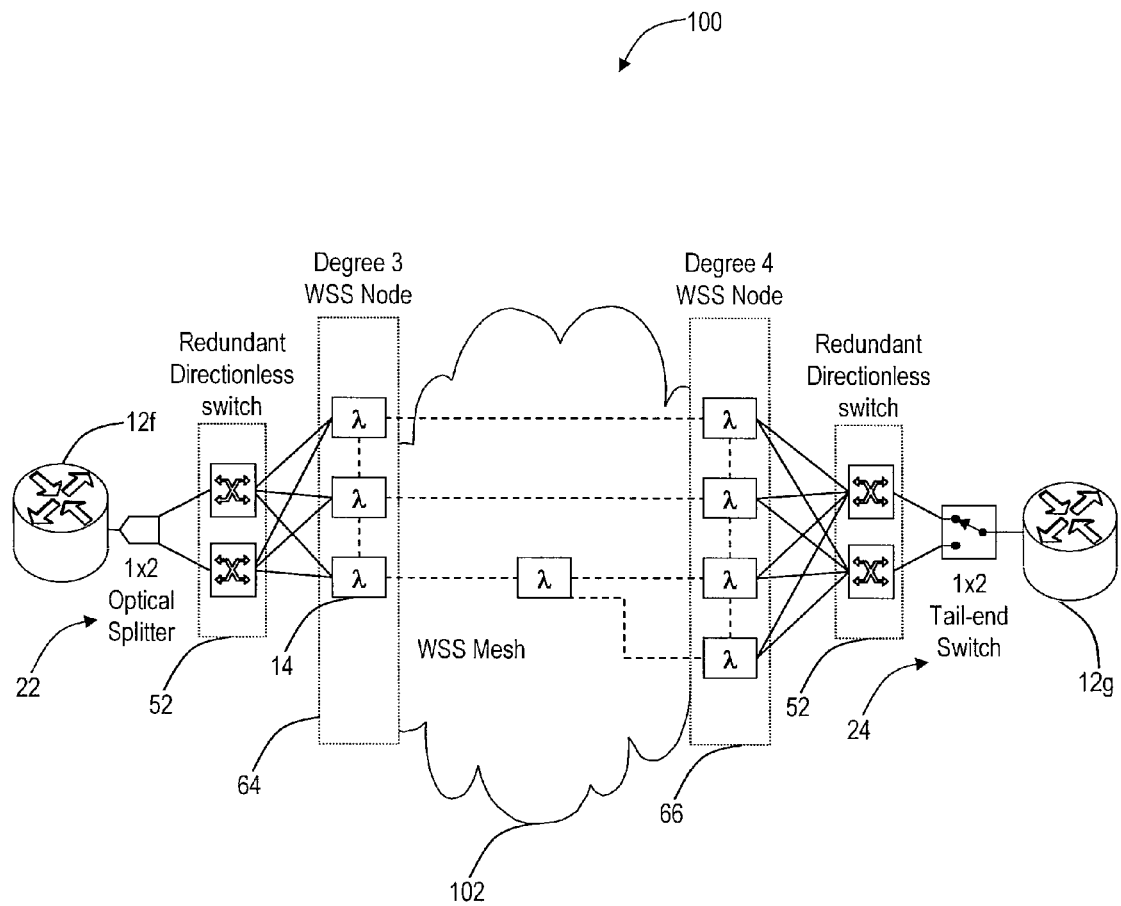
FIGS. 25-29 are diagrams of a high availability router interconnect with two routers interconnected over an optical network utilizing a directionless architecture according to an exemplary embodiment of the present invention.

FIG. 25 illustrates an equipment configuration of the interconnect 100. Each router 12*f*,12*g* includes a single optical transceiver, such as a 10 G, 40 G, 100 G, or the like transceiver. The single optical transceiver at the router 12*f* is connected to a 1×2 optical splitter 22 which is configured to replicate the signal and provide the signal to two separate switches in the redundant directionless switch 52. The switch 52 provides the duplicate signals to separate WSSs 14 at the ROADM node 64 for transmission over the optical network 102.

The ROADM node 66 receives the duplicate signals at separate WSSs 14 after transmission over the optical network 102. The outputs from the various WSSs 14 are connected to another redundant directionless switch 52 which connects to a 1×2 tail-end switch 24. The tail-end switch 24 is configured to receiver both duplicate signals and to provide one output to the optical transceiver on the router 12*g*. The tail-end switch 24 is configured to switch between signals based on a predetermined condition, such as loss-of-signal, alarm indication signal, signal degrade, and the like.

Figure 26:
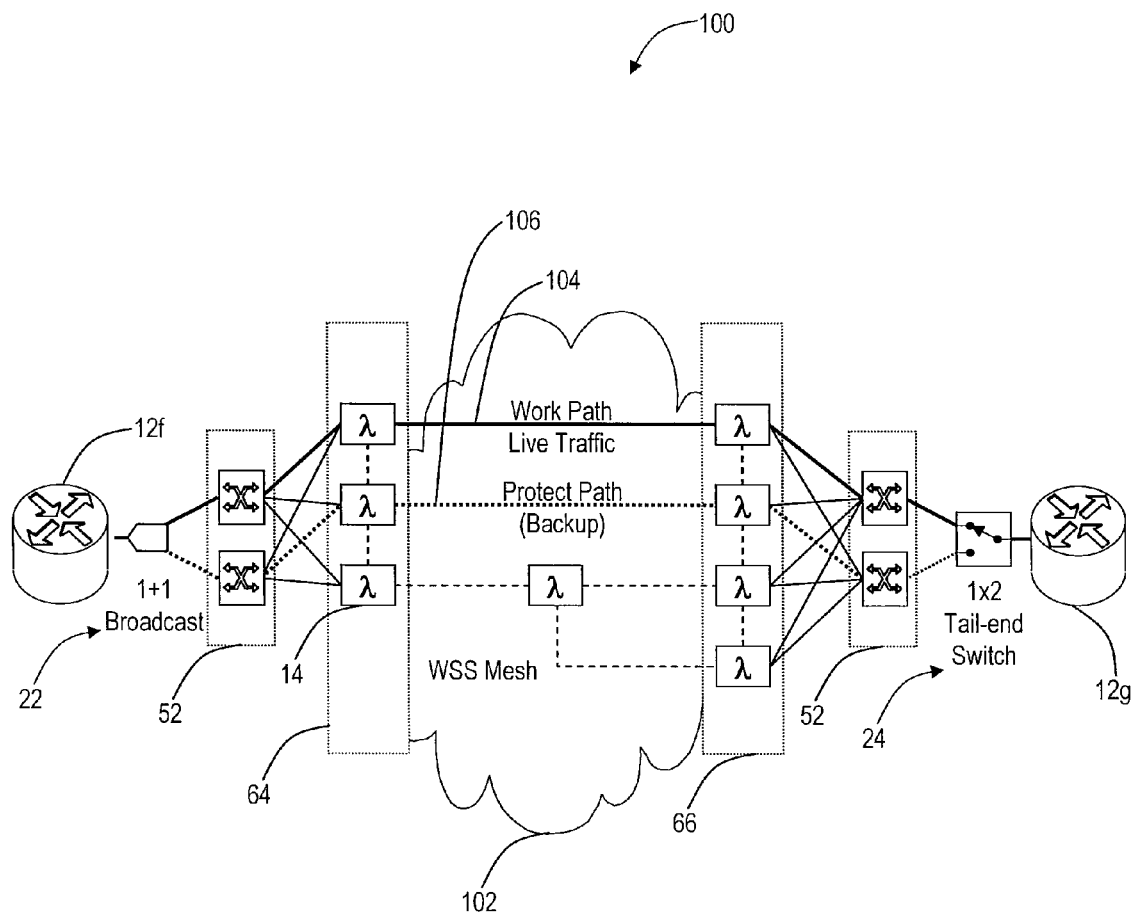

FIG. 26 illustrates a work path 104 and a protect path 106 through the optical network 102. The duplicate signals are sent on each of the paths 104,106 based on a 1+1 optical broadcast through the optical splitter 22. Advantageously, the interconnect 100 minimizes expensive optical transceivers on the routers 12*f*,12*g* while maintaining a highly available architecture through optical 1+1 protection and route diversity.

Figure 27:
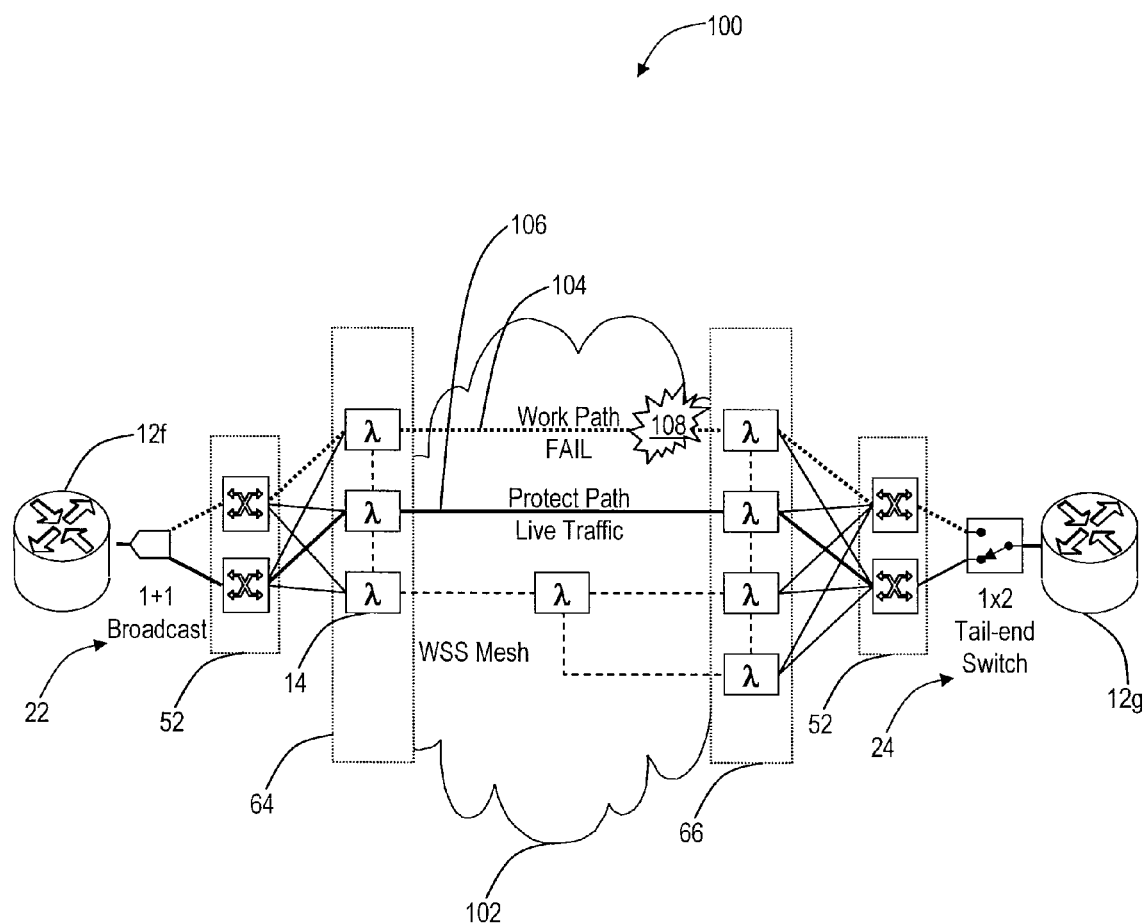

FIG. 27 illustrates a rapid protection response of the optical 1+1 protection based on a fault 108 on the working path 104. The router 12*f* does not implement any action here since it is sending duplicate signals through the splitter 22. Instead, at the router 12*g*, the tail-end switch 24 realizes the fault 108 and performs a switch to the protect path 106 restoring connectivity between the routers 12*f*,12*g*.

Figure 28:
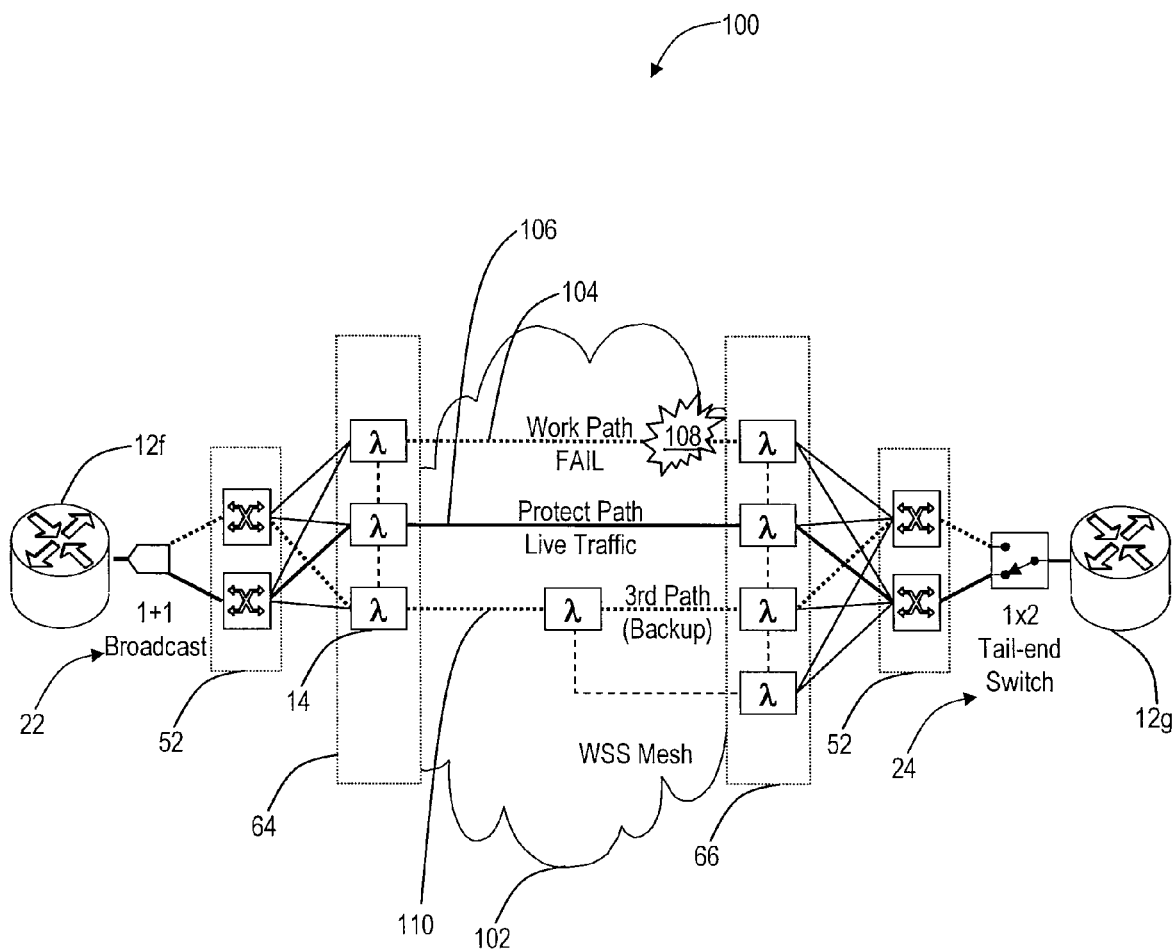

FIG. 28 illustrates a reconfiguration to provide a third path 110 to maintain route diversity during the fault 108 on the working path 104. Here, the switch 52 at the router 12*f* is configured to move the signal from the working path 104 to another WSS 14 on the third path 110. Also, the switch 52 at the router 12*g* is also configured to move the output from the working path 104 to the third path 110. Now, the interconnect 100 maintains route diversity despite a failure on the working path 104.

Figure 29:
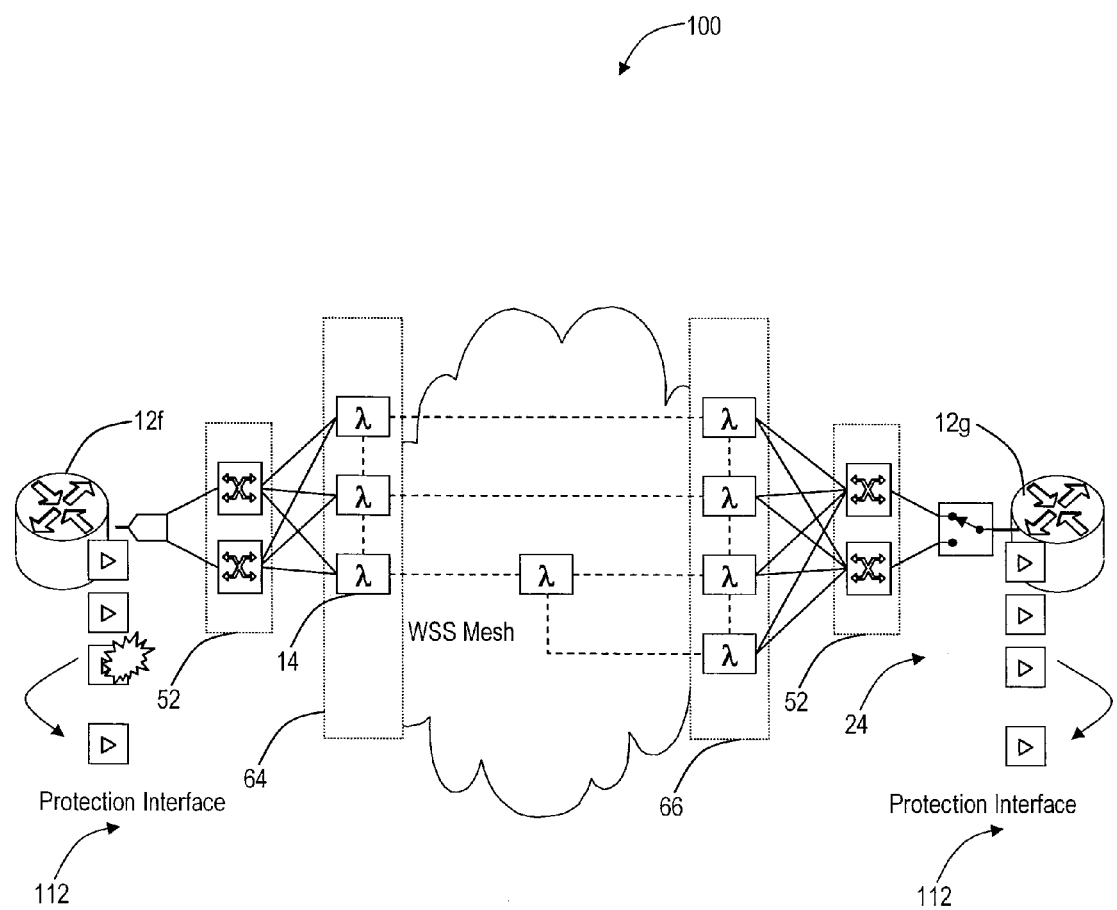

Advantageously, the optical 1+1 and directionless architecture provide protection and diversity despite faults while minimized transceiver costs. Note, as rates increase to 40 G, 100 G, etc., the optical transceiver costs dominate capital expense. However, the optical 1+1 does not protect against transceiver failures at the routers 12f,12g. FIG. 29 illustrates a 1:N protection mechanism 112 for optical transceivers on the routers 12f,12g. 1:N means one protection transceiver can provide equipment redundancy for up to N working transceivers. Note, the 1:N protection mechanism 112 for optical transceivers can also be utilized on Ethernet platforms, SONET/SDH platforms, OTN platforms, etc.

At the router 12f, each working and protect transceiver is connected to the switch 52 through an optical splitter 22. In the event a working transceiver fails, the protect transceiver is configured to take over transmitting the working transceiver's signal through the optical splitter 22 and the switch 52 and onto the optical network 102. Advantageously, the 1:N protection mechanism 112 minimizes transceiver costs by only using one protection transceiver for N working transceivers. For example, the 1:N protection mechanism 112 can be utilized with mesh restoration to provide similar resiliency as provided with ring configurations while providing better efficiency than rings.

Figure 30:
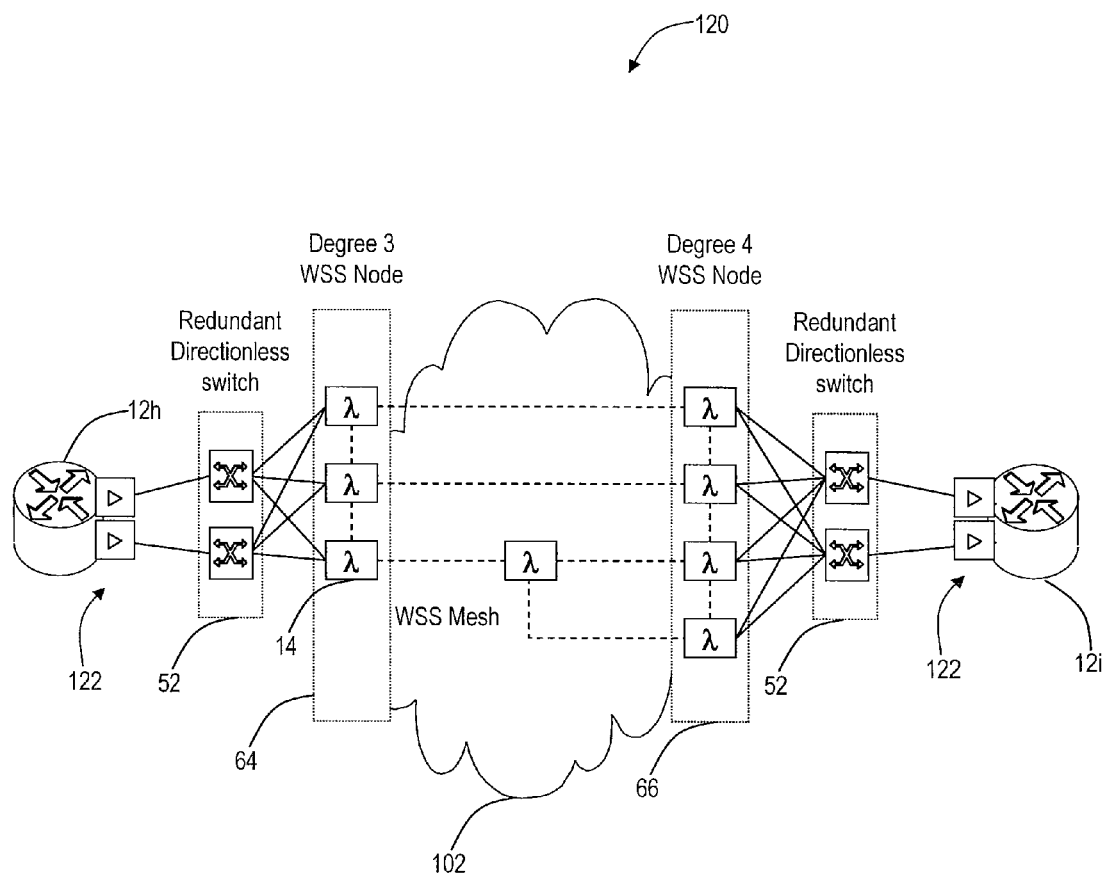
FIGS. 30-34 are diagrams of a high availability router interconnect with two routers interconnected with dual ports over an optical network utilizing a directionless architecture according to an exemplary embodiment of the present invention.

Referring to FIGS. 30-34, a high availability router interconnect 120 is illustrated with two routers 12h,12i interconnected with dual ports 122 over an optical network 102 utilizing a directionless architecture according to an exemplary embodiment of the present invention. Each of the routers 12h,12i include the dual ports 122 with each port connected to a separate switch in the redundant directionless switch 52. The switch 52 provides signals from each port to separate WSS 14 at the ROADM node 64 for transmission over the optical network 102. FIG. 30 illustrates an equipment configuration of the interconnect 120.

Figure 31:
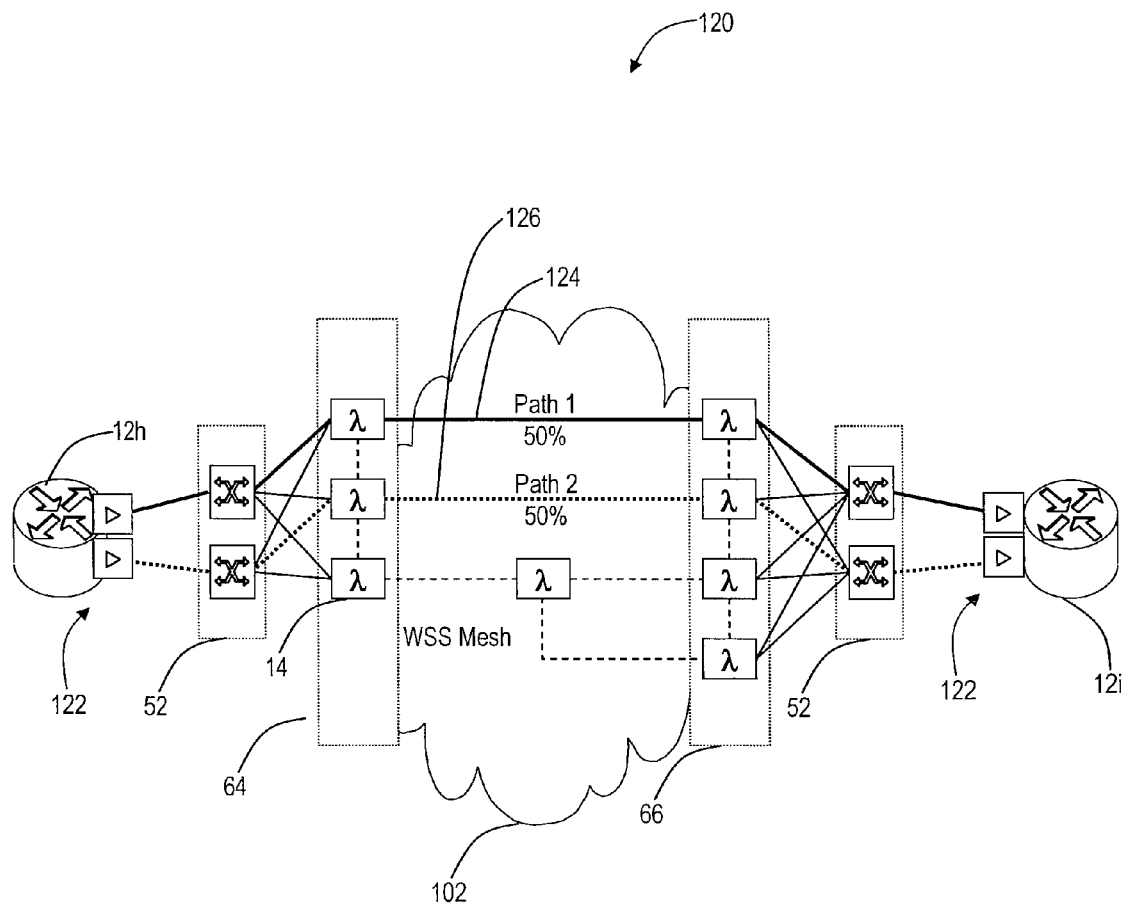

The ports 122 can each be configured to carry working traffic between the routers 12h,12i. FIG. 31 illustrates a link sharing on the ports 122, such as utilizing MPLS Traffic Engineering (MPLS-TE). Here, two paths 124,126 each are configured to provide traffic between the routers 12h,12i with excess capacity to provide for rerouting in the event of a failure on one of the paths 124,126. Note, this configuration provides both route and transceiver protection.

Figure 32:
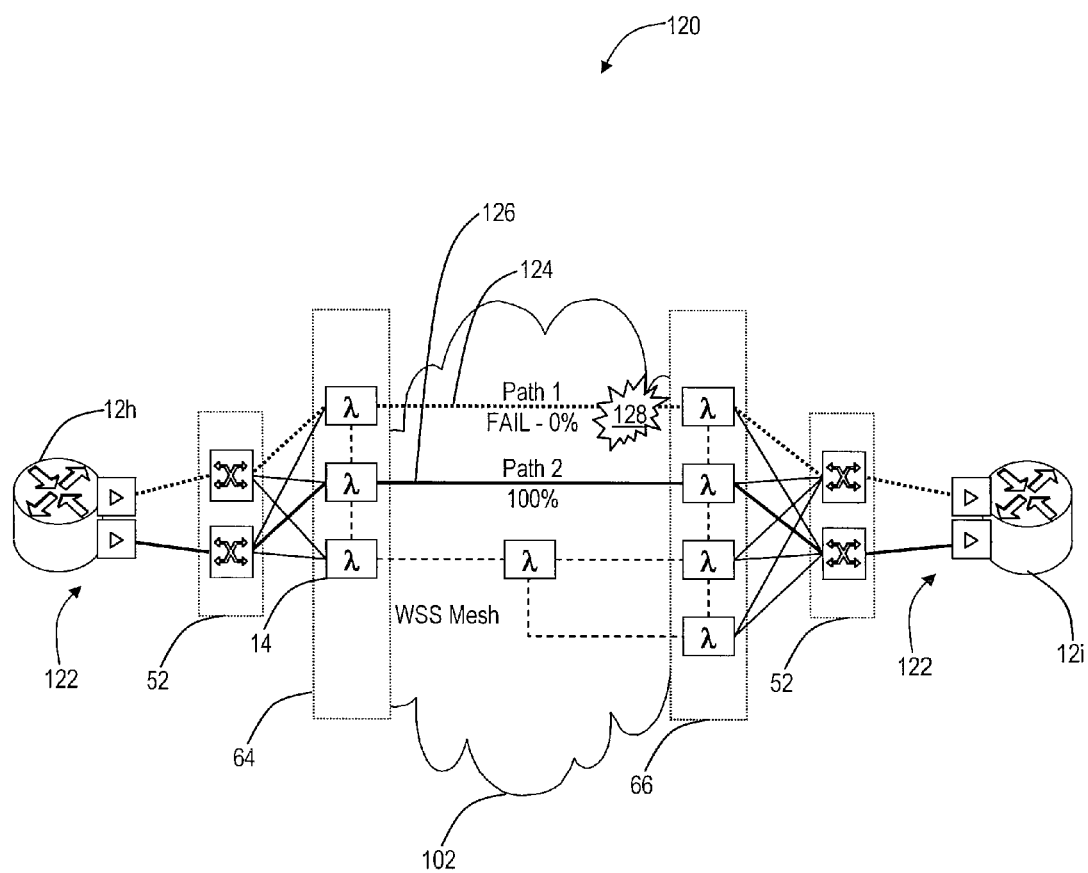
Figure 33:
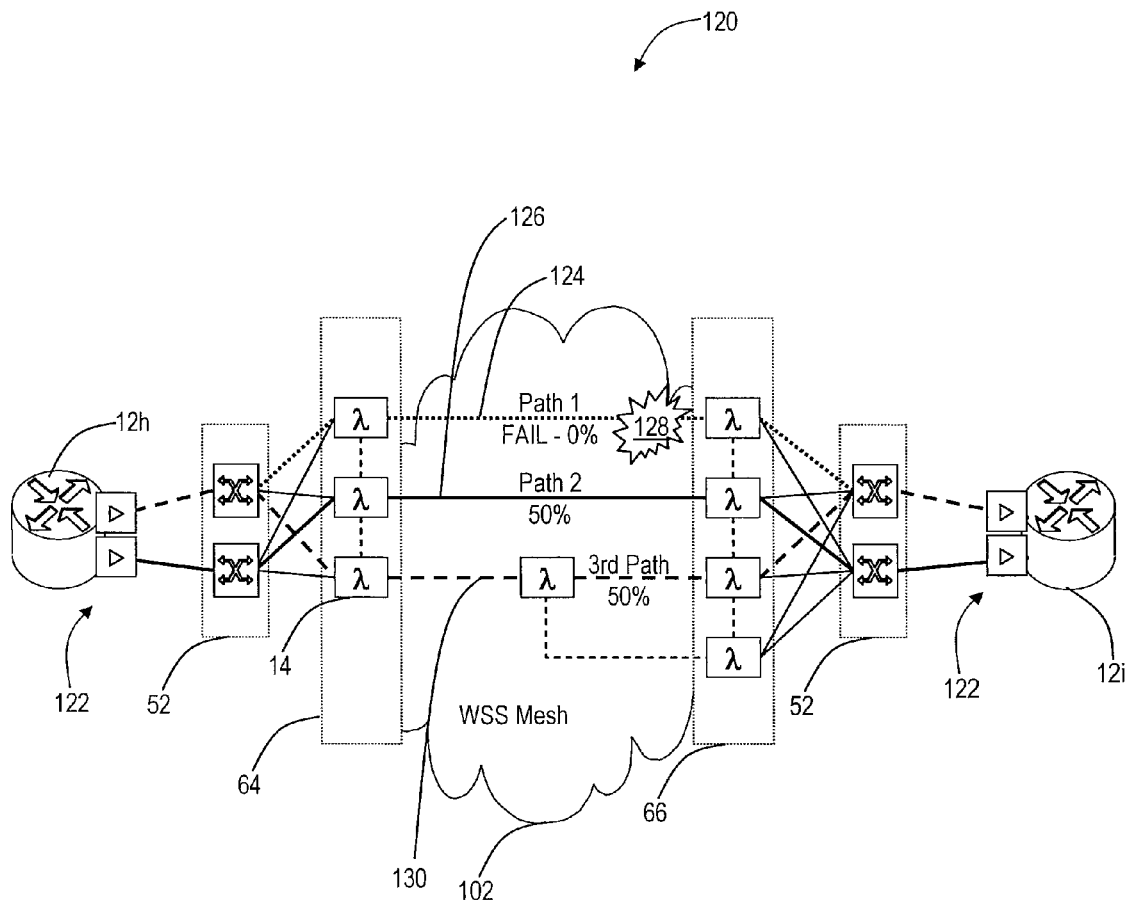
Figure 34:
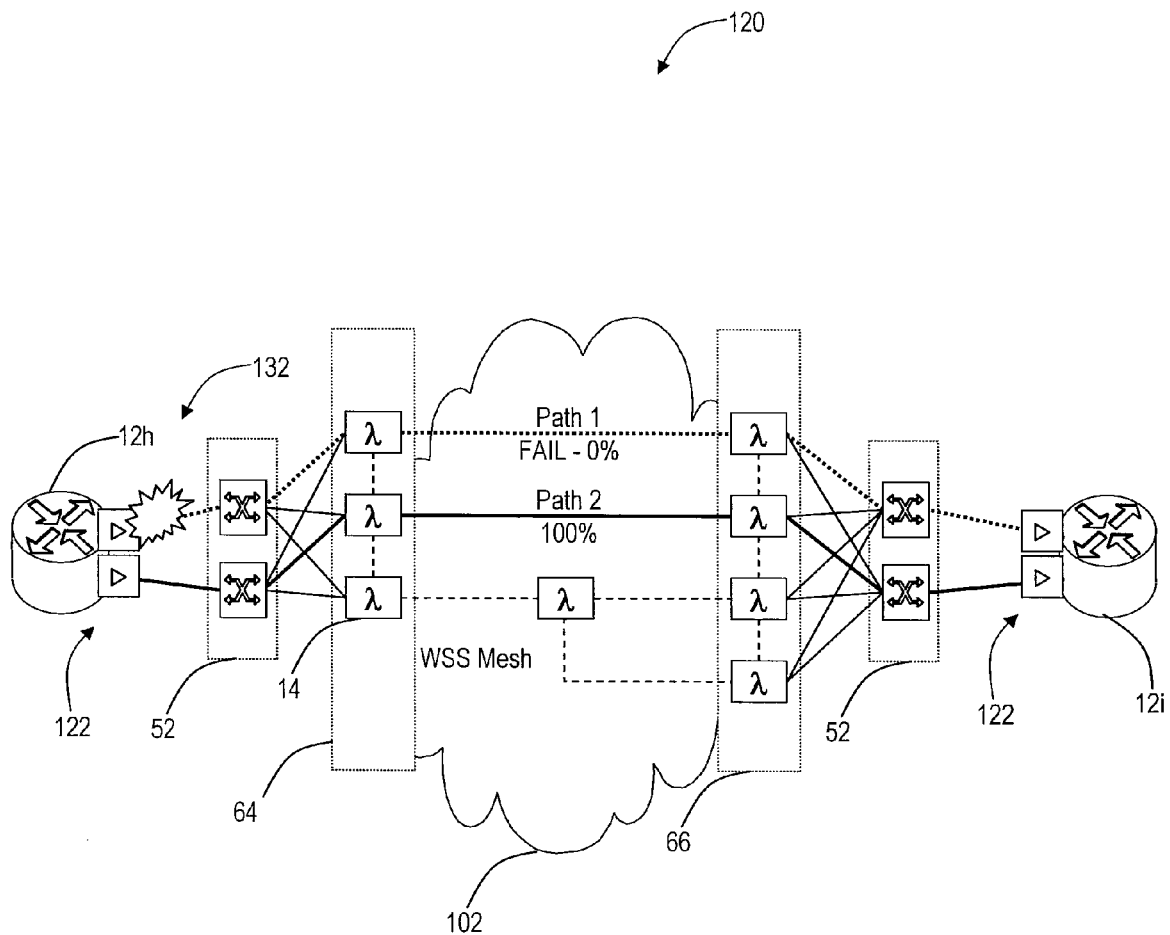

FIG. 32 illustrates a rapid protection response of the interconnect 120. Here, the first path 124 has a failure 128 on it. After the failure 128, all traffic from the path 124 is rerouted to the path 126. For example, this can be accomplished using MPLS-FRR (fast reroute). Now, the path 126 is utilized up to full capacity leaving no additional route protection in the interconnect 120. FIG. 33 illustrates a third path 130 for restoring path diversity while the path 124 is down. The third path 130 is configured by rerouting the optical transceiver from the first path 124 using the switch 52 to the third path 130. FIG. 34 illustrates a 1+1/1:1 protection mechanism 132 on the dual port transceivers 132 according to an alternate embodiment of the present invention. 1+1/1:1 protection 132 provides layer one protection against faults at both the dual port transceivers 122 and on the paths.

Figure 35:
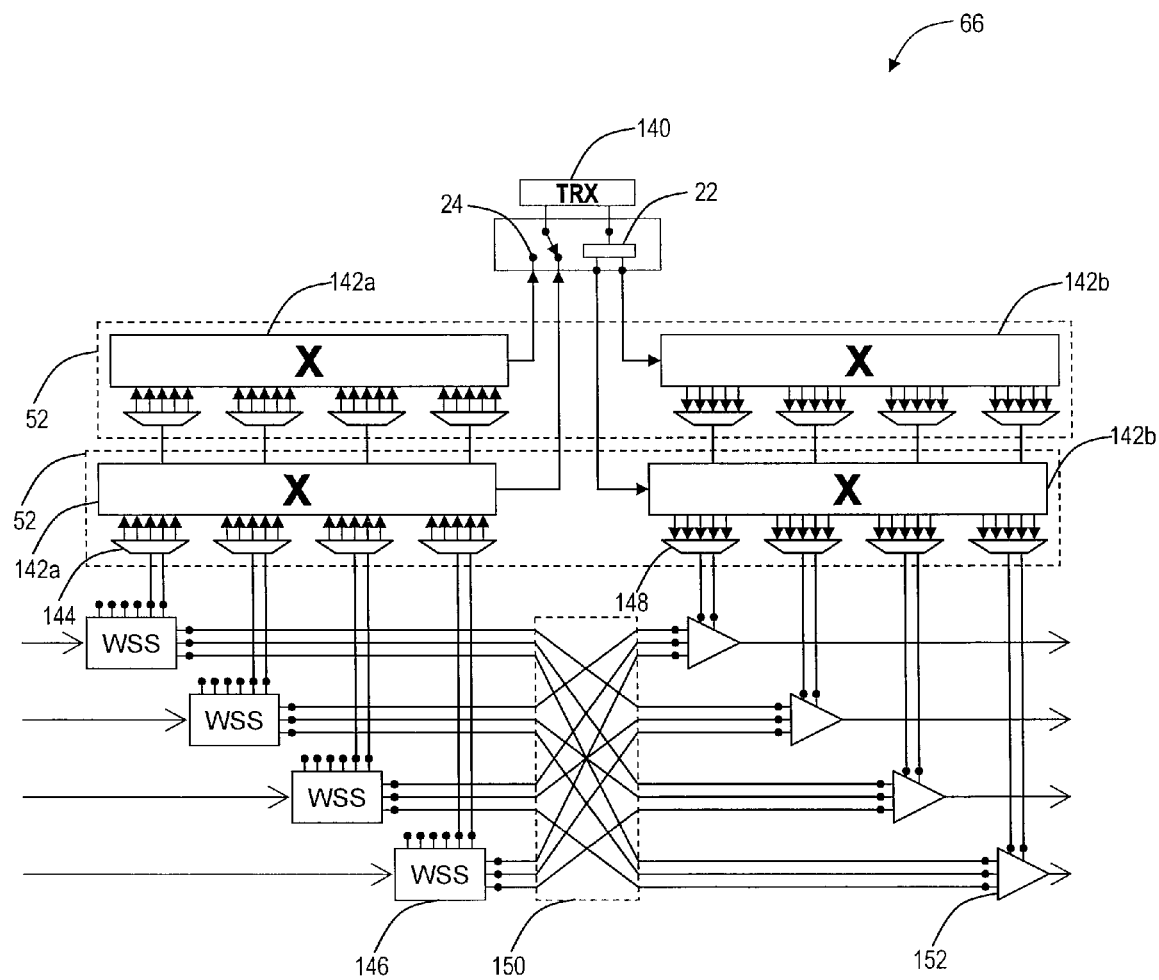
FIGS. 35-37 are diagrams of a degree four ROADM node with redundant directionless switches for a directionless architecture according to an exemplary embodiment of the present invention.
Figure 36:
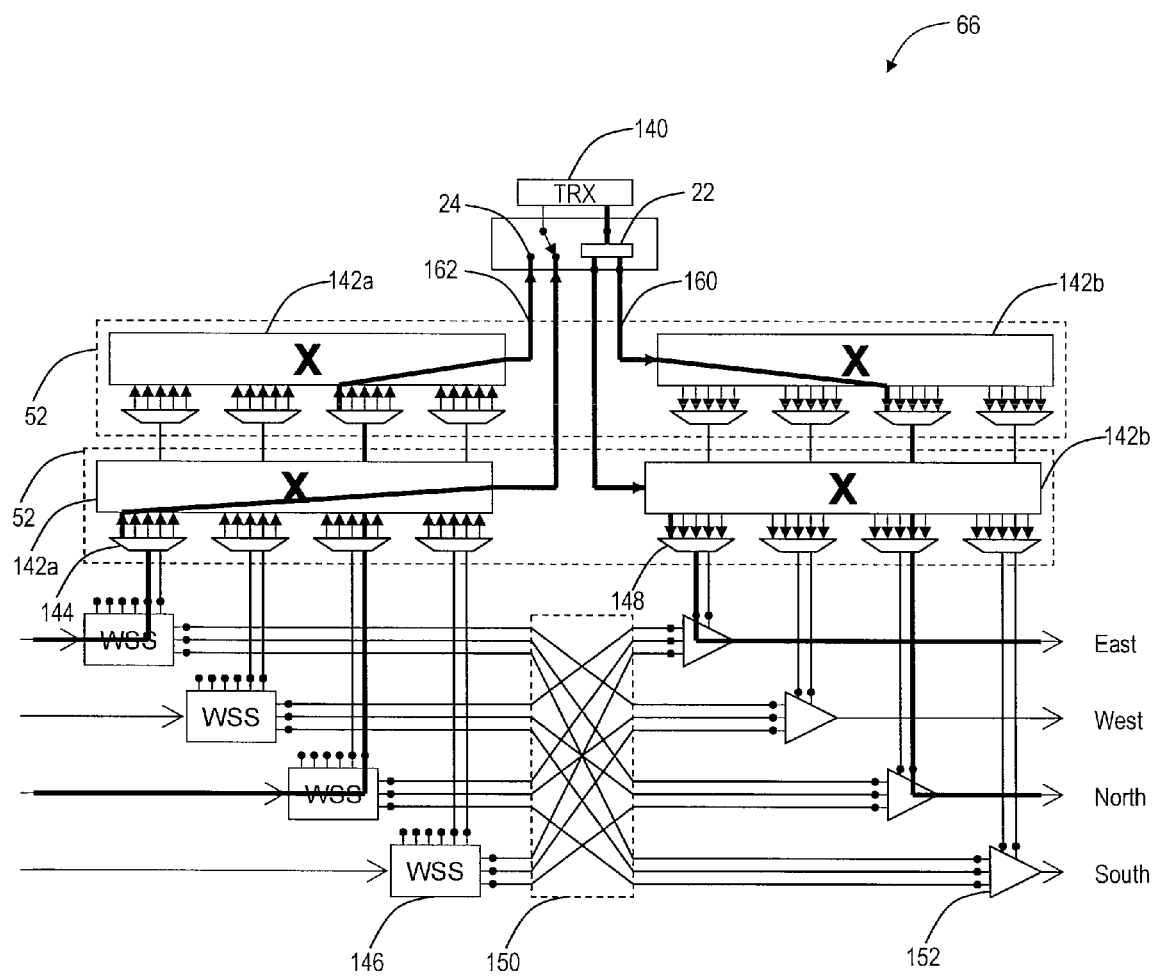
Figure 37:
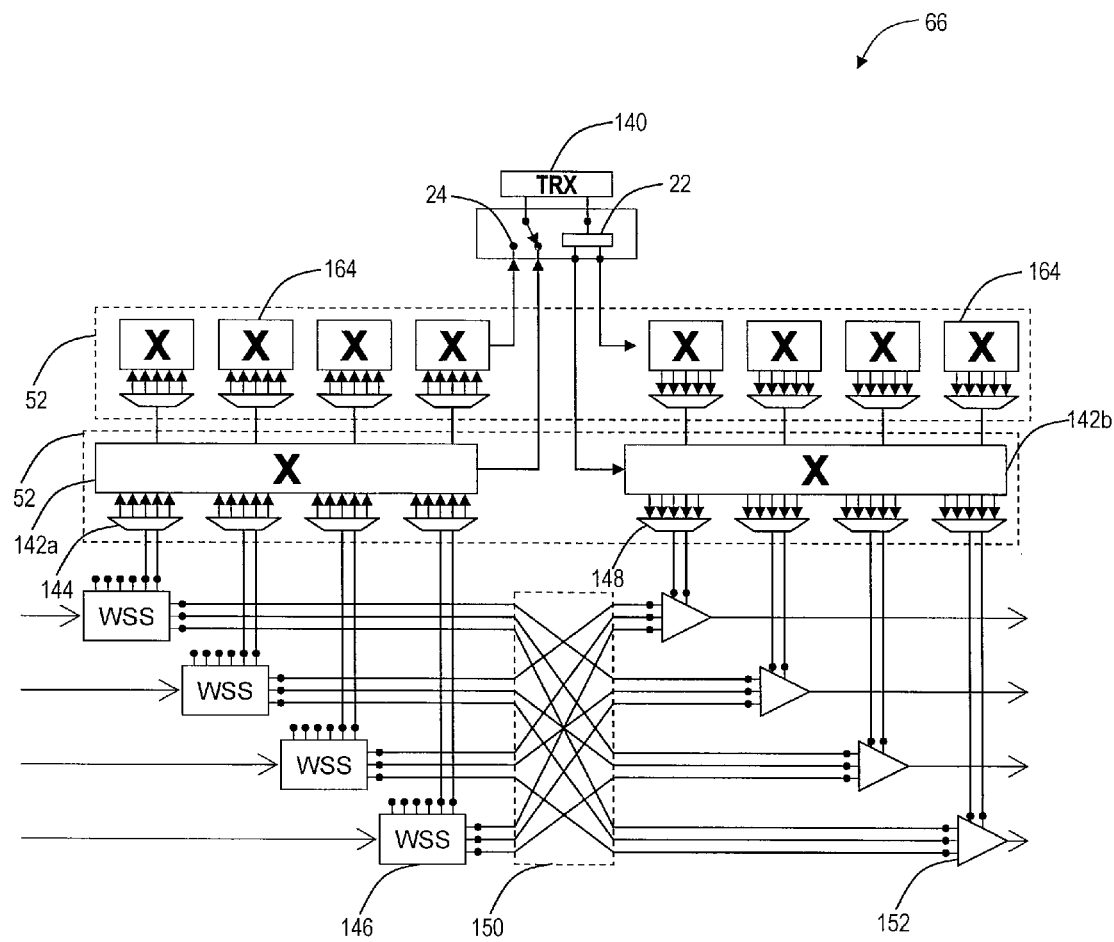

Referring to FIGS. 35-37, a degree four ROADM node 66 is illustrated with redundant directionless switches 52 for a directionless architecture according to an exemplary embodiment of the present invention. The ROADM node 66 is illustrated with the optical 1+1 protection scheme formed with a splitter 22 and a tail-end switch 24. An optical transceiver 140 is connected to the splitter 22 on a transmitter and to the tail-end switch 24 on the receiver. Note, the optical transceiver 140 can be in a router, switch, optical cross-connect, WDM transponder, and the like, i.e. although the present invention has been illustrated herein with regard to an IP router, those of ordinary skill in the art will recognize that the present invention can equally apply to any device utilizing an optical transceiver and the like.

The ROADM node 66 includes two redundant directionless switches 52 each includes two optical switches 142. The separate optical switches 52 provide redundancy at the ROADM node 66, i.e. a failure of one optical switch 52 is not a single point of failure. Each of the optical switches 142 are separated for receive and transmit sides (denoted as 142a for receive and 142b for transmit) of the transceiver 140. The receive side switches 142a receive inputs from demultiplexers 144. The demultiplexers 144 receive outputs from four WSS 146 devices. The WSSs 146 receive inputs external to the node 66 from optical fibers. As described herein, the WSSs 146 are configured to dynamically route one or more wavelengths to each demultiplexer. The receive side switches 142a each provide an output to the tail-end switch 24.

The transmit side switches 142b each receive an output from the splitter 22, and connect to multiple multiplexers 148 which are configured to multiplex one or more outputs from the switches 142b. Outputs from the multiplexers 148 can be combined with pass-through signals 150 from the WSSs 146 for output from the node 66. For example, the multiplexer 148 outputs and pass-through signals 150 can be combined with a multiplexer 152. Additionally, those of ordinary skill in the art will recognize that this degree four configuration can also be extended to different degree configurations as are known in the art.

FIG. 36 illustrates an exemplary path through the ROADM node 66 for dual transmit/receive signals 160,162. In this configuration, the four inputs/outputs from the ROADM node 66 are labeled as East, West, North, and South. The transceiver 140 transmits a signal to the splitter 22 which provides a dual transmit signal 160 to each of the transmit switches 142b. The first transmit switch 142b sends one of the dual transmit signals 160 in the North direction, and the second transmit switch 142b sends the other of the dual transmit signals 160 in the East direction. The WSSs 146 for North and East directions receive dual receive signals 162 and provide each to one of the receive switches 142a. Each of the receive switches 142a connect the dual receive signal 162 to the tail-end switch 24.

FIG. 37 illustrates an alternative configuration of the ROADM node 66 with one of the redundant directionless switches 52 configured as a combination of multiple small-scale switches 164. Advantageously, the small-scale switches 164 minimize capital expense allowing a configuration which fits the actual deployment size of the ROADM node 66, and enables the ROADM node 66 to scale as bandwidth is required.

Figure 38:
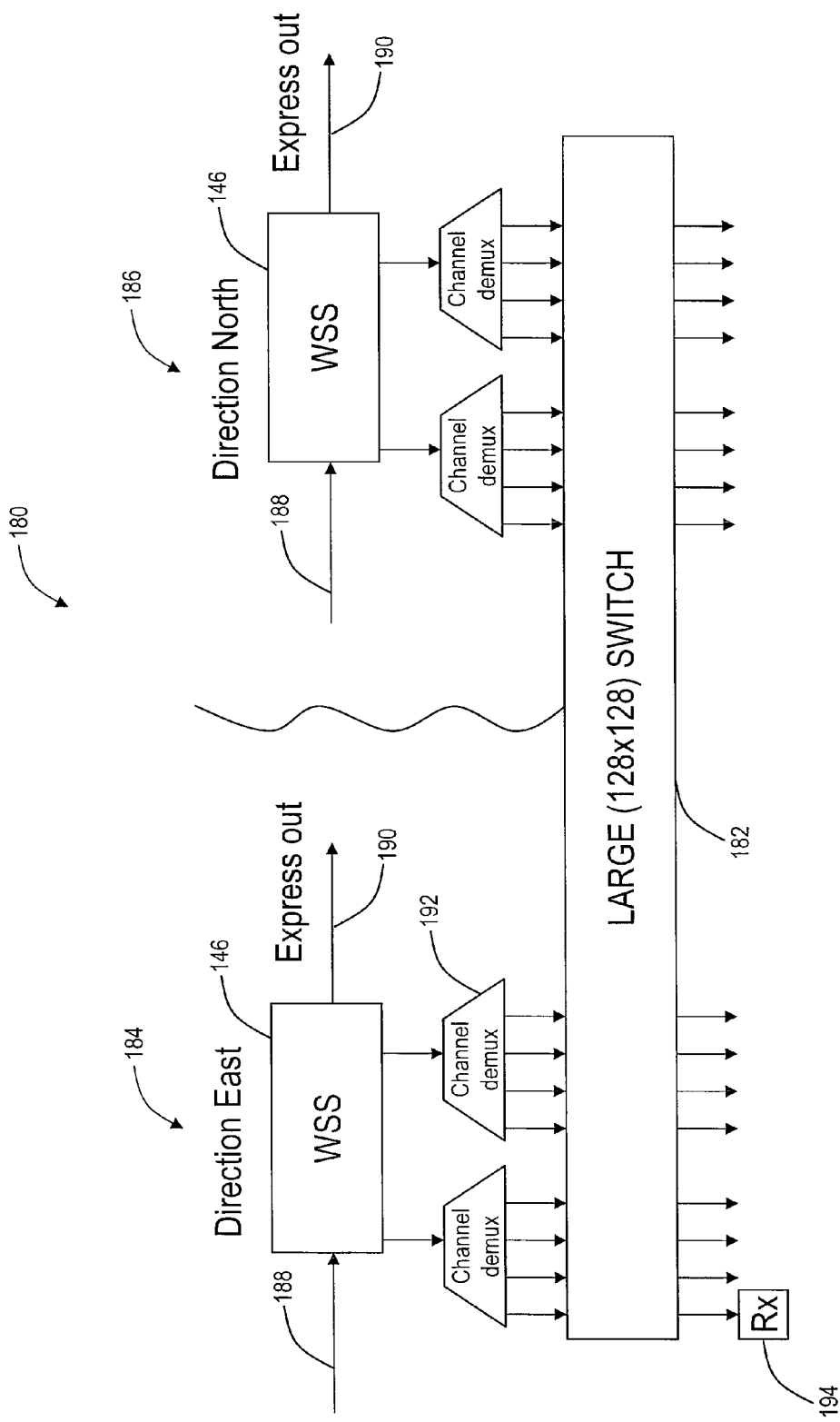
FIG. 38 is a diagram of a directionless ROADM node with a single large switch according to an exemplary embodiment of the present invention.

Referring to FIG. 38, a directionless ROADM node 180 is illustrated with a single large switch 182 according to an exemplary embodiment of the present invention. The ROADM node 180 only shows a drop side for illustration purposes, and those of ordinary skill in the art will recognize that the ROADM node 180 can include an add side with similar components. The ROADM node 180 is of degree two with an East and North direction 184,186. Each direction 184,186 includes a WSS 146 which receives an input 188 and provides an express output 190. The input 188 is received from a node external to the node 180, such as over optical fiber, and the output 190 transmits from the node 180 to another node.

The WSS 146 is configured to reconfigurably drop different wavelengths from the input 188 to a channel demultiplexer 192. The demultiplexer 192 is configured to separate one or more channels. In this exemplary embodiment, outputs from the various demultiplexers 192 are connected to the switch 182. The switch 182 provides a directionless architecture similar to the switch 52 described herein. The switch 182 can route outputs from any of the demultiplexers 192 to any receiver 194. This avoids the need to hard-wire receivers 194 to the demultiplexers 192 allowing path changes as described herein. Note, the switch 182 requires full capacity up from for all receiver 194 connections. This could require a lot of demultiplexers 192 and significant wiring upon initial deployment.

Figure 39:
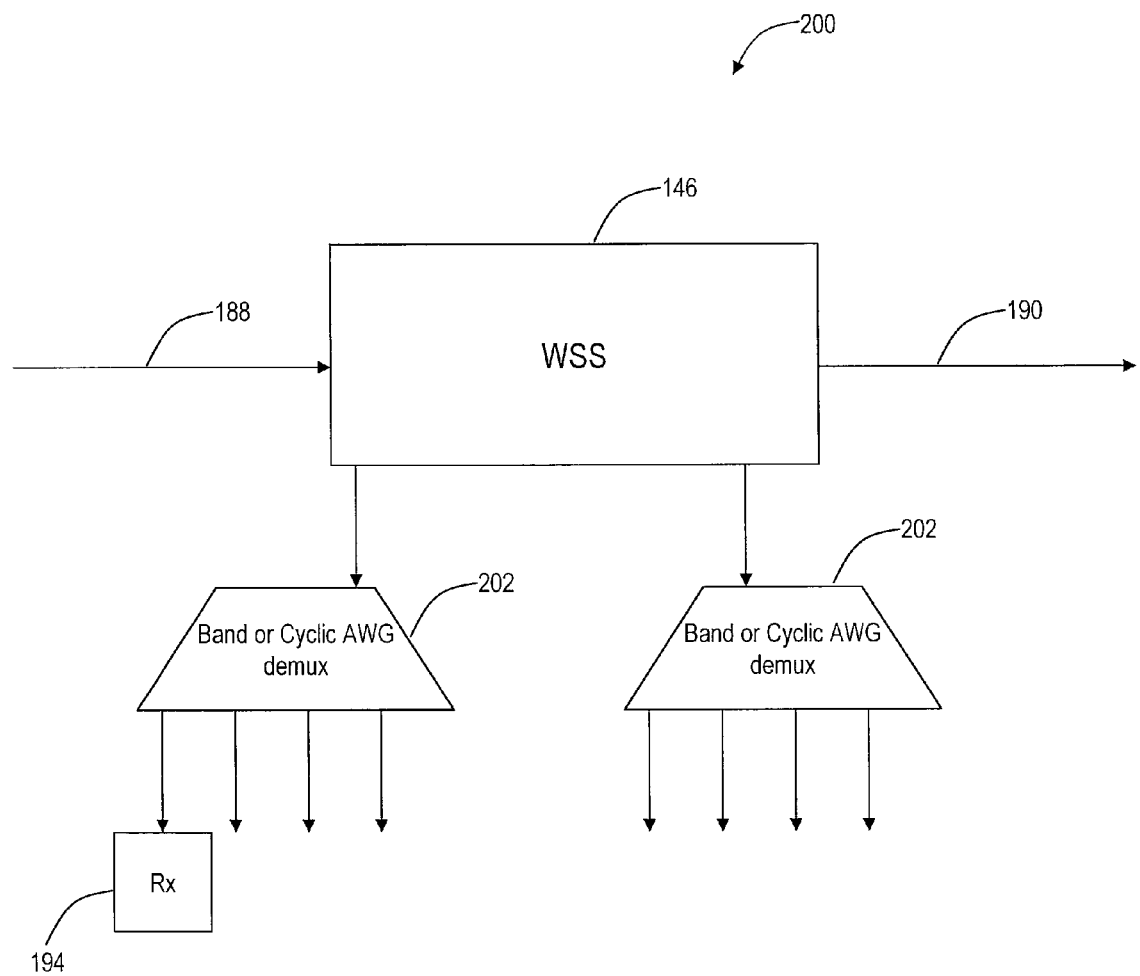
FIG. 39 is a diagram of a ROADM configuration with multi-λ fixed filters according to an exemplary embodiment of the present invention.

Referring to FIG. 39, a ROADM configuration 200 is illustrated with multi-λ fixed filters 202 according to an exemplary embodiment of the present invention. The ROADM configuration 200 is similar to FIG. 38, but uses the multi-λ fixed filters 202 instead of the single λ demultiplexers 192. For example, the multi-λ fixed filters 202 can include band splitter or cyclic arrayed waveguide gratings (AWG). This configuration provides fewer unused ports as the network grows since each port of the filters 202 can provide multiple wavelengths. For example, each filter 202 can provide a 4-channel passband on each of 10 ports to provide a total capability of 40-channels for each filter 202. The configuration 200 can leverage wavelength tunablity on optical transceivers to re-optimize a network and reduce wavelength blocking probability.

Advantageously, the multi-channel (either band-wide or cyclic AWG) fixed filters under the WSS layer provide the WSS 146 single channel selectivity. The ROADM configuration 200 still preserves some channel wavelength tunability, but with the cost of fixed filters. The ROADM configuration 200 also allows a more scalable growth in the switch size that gets used in the directionless architecture. The ROADM configuration 200 provides a balance between tunability and cost. Tunability is available within the ranges of the filters 202 allowing wavelength assignments to be dynamically changed to re-optimize a network and reduce wavelength blocking probability.

Figure 40:
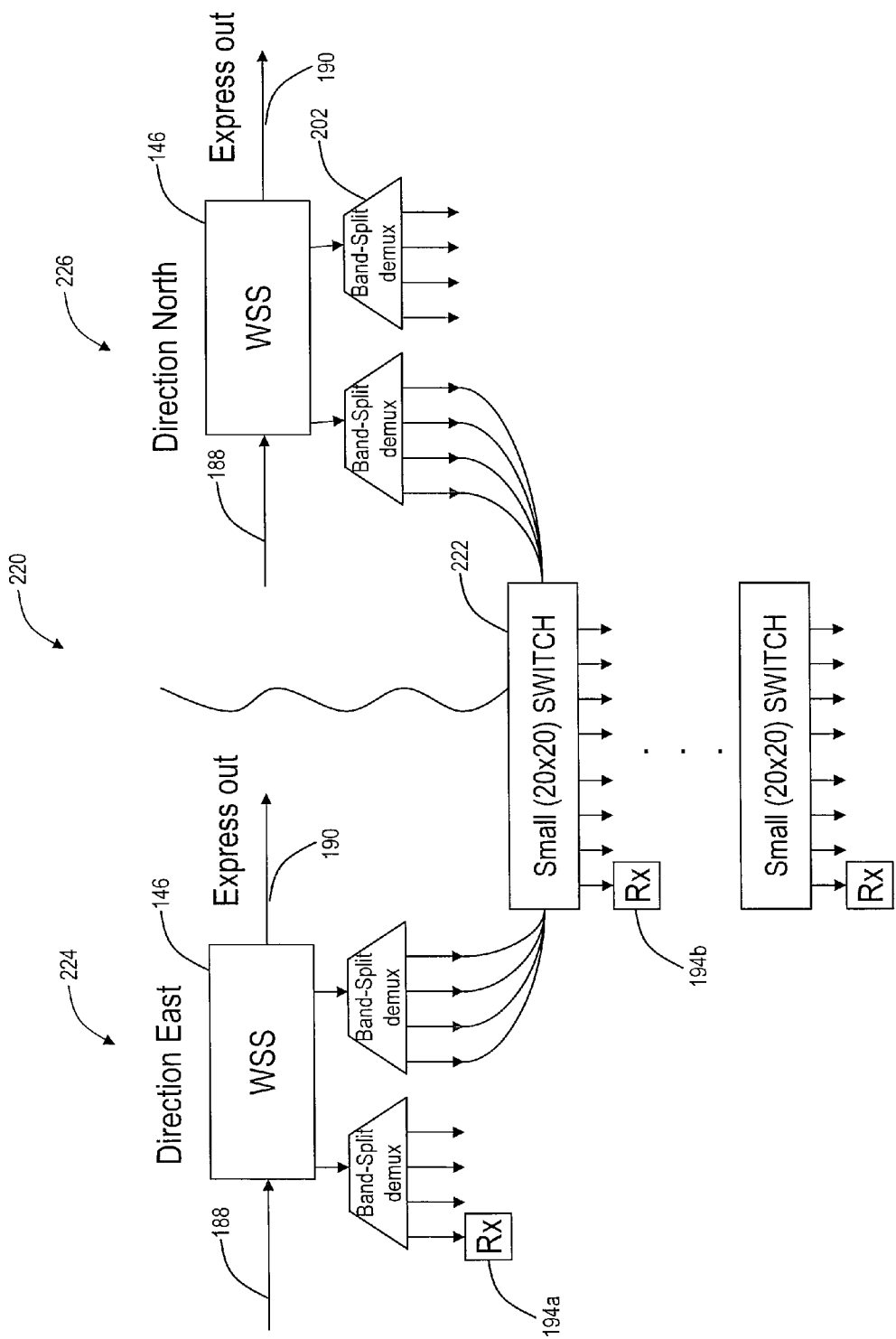
FIG. 40 is a diagram of a directionless ROADM node with one or more small scale switches and multi-λ fixed filters according to an exemplary embodiment of the present invention.

Referring to FIG. 40, a directionless ROADM node 220 is illustrated with one or more small scale switches 222 and multi-λ fixed filters 202 according to an exemplary embodiment of the present invention. The ROADM node 220 only shows a drop side for illustration purposes, and those of ordinary skill in the art will recognize that the ROADM node 220 can include an add side with similar components. The ROADM node 220 is of degree two with an East and North direction 224,226. Each direction 224,226 includes a WSS 146 which receives an input 188 and provides an express output 190. The input 188 is received from a node external to the node 180, such as over optical fiber, and the output 190 transmits from the node 180 to another node.

In this exemplary embodiment, receivers 194a, 194b can be either directional or directionless. For example, receiver 194a can be initially connected directly to the filter 202 for a directional configuration. However, the node 220 can evolve to a directionless configuration through the addition of the switch 220 and connecting the receiver 194b directly to the switch 222 instead of the filter 202. Additionally, extra switches 222 can be added to provide efficient growth and added redundancy.

Figure 41:
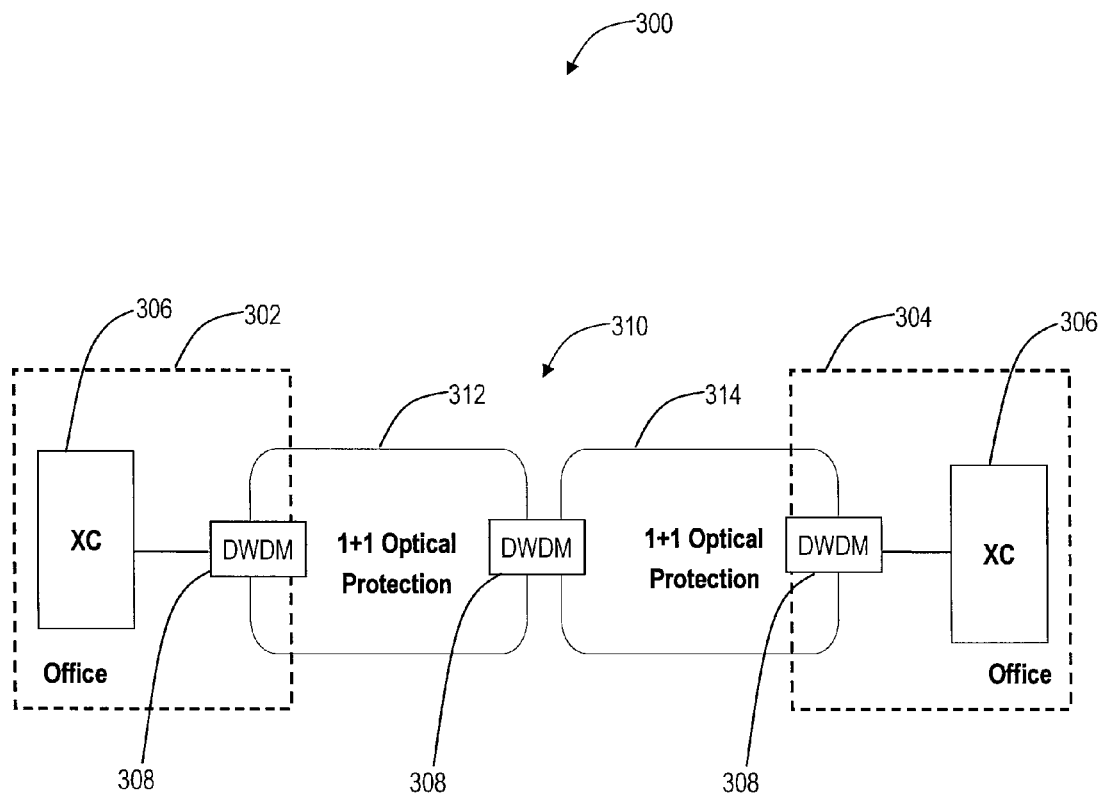
FIG. 41 is a diagram of a network illustrating connections between two offices utilizing a combination of mesh restoration and optical ring restoration according to exemplary embodiment of the present invention.

Referring to FIG. 41, a network 300 illustrates connections between two offices 302,304 utilizing a combination of mesh restoration and optical ring restoration according to an exemplary embodiment of the present invention. Each office 302, 304 includes a cross-connect 306 and a DWDM (dense-WDM) platform 308. The cross-connect 306 can include an optical switch or multi-service platform configured to provide SONET/SDH/OTN switching, and the DWDM platform 308 is configured to transmit/receive multiple wavelengths over an optical network 310. Alternatively, the cross-connect 306 can also be an IP router, Ethernet switch, or the like.

The cross-connects 306 are configured to provide mesh restoration, such as using ITU-T Automatically Switched Optical Network (ASON), IETF Generalized Multi-Protocol Label Switching (G-MPLS) also known as Automatic Switched Transport Network (ASTN), or the like. The DWDM platforms 308 are configured to provide optical 1+1 protection such as described herein with the splitter 22 and tail-end switch 24.

Advantageously, the present invention combines the use of mesh restoration and optical ring protection (i.e., not SONET/SDH) to achieve super high availability performance. The optical ring protection can utilized G.709/OTN to encapsulate SONET/SDH signals while maintaining the mesh restoration on the underlying SONET/SDH signals. Additionally, G.709/OTN provides a header with operations, administration, maintenance, and provisioning (OAM&P) capabilities on the optical ring, such as determining fault conditions. The G.709/OTN optical rings provide high availability connectivity for the mesh SONET/SDH connections.

The cross-connect nodes 306 that participate in mesh restoration are connected together using cascaded protection rings 312,314 based on the DWDM platform 308. The use of cascaded protection rings 312,314 provides protection against a single fiber failure within the context of a small geographical domain. Thus, multiple fiber failures may exist simultaneously (on different rings 312,314) between a pair of mesh restoration nodes without the need to implement mesh restoration.

The present invention utilizes a protected transparent ring solution between mesh restoration nodes, such as cross-connects 306. These transparent rings 312,314 can include simple optical 1+1/tail-end protection of optical signals over fiber or WDM or, if a managed solution is preferred, then the rings can be defined using OTN/G.709 framing. For example, DWDM platforms 308 can be configured to frame incoming signals from the cross-connect 306 using G.709. This provides complete transparency while providing OAM&P at the DWDM layer. The G.709 framing can be utilized to indicate a protection switch at the DWDM layer.

In this scenario, the connection between a pair of cross-connect nodes 306 simply looks like a highly available SDH or SONET connection. The cross-connect nodes 306 communicate as if each is an adjacent SONET or SDH line or multiplex section terminating piece of equipment. Signaling and routing protocols for mesh restoration can communicate unimpeded across the chosen Data Communications Channel (DCC). The present invention cascades multiple optical protection rings 312,314 and combines the protection attributes of these rings 312,314 with mesh restoration to achieve a higher availability solution.

For the present invention to work, a hold-off timer is required at each cross-connect node 306. In the event of a failure, the cross-connect node 306 detects the failure and attempt to recover service. In this scenario, the cross-connect node 306 must wait to confirm that the intermediate 1+1 optical layer protection has not recovered the service before implementing its own recovery efforts. Because the proposed 1+1 optical protection is based on tail-end protection, it is expected to be rapid so the cross-connect node 306 hold off timer can be quite short, i.e. to ensure sub-50 ms restoration.

Figure 42:
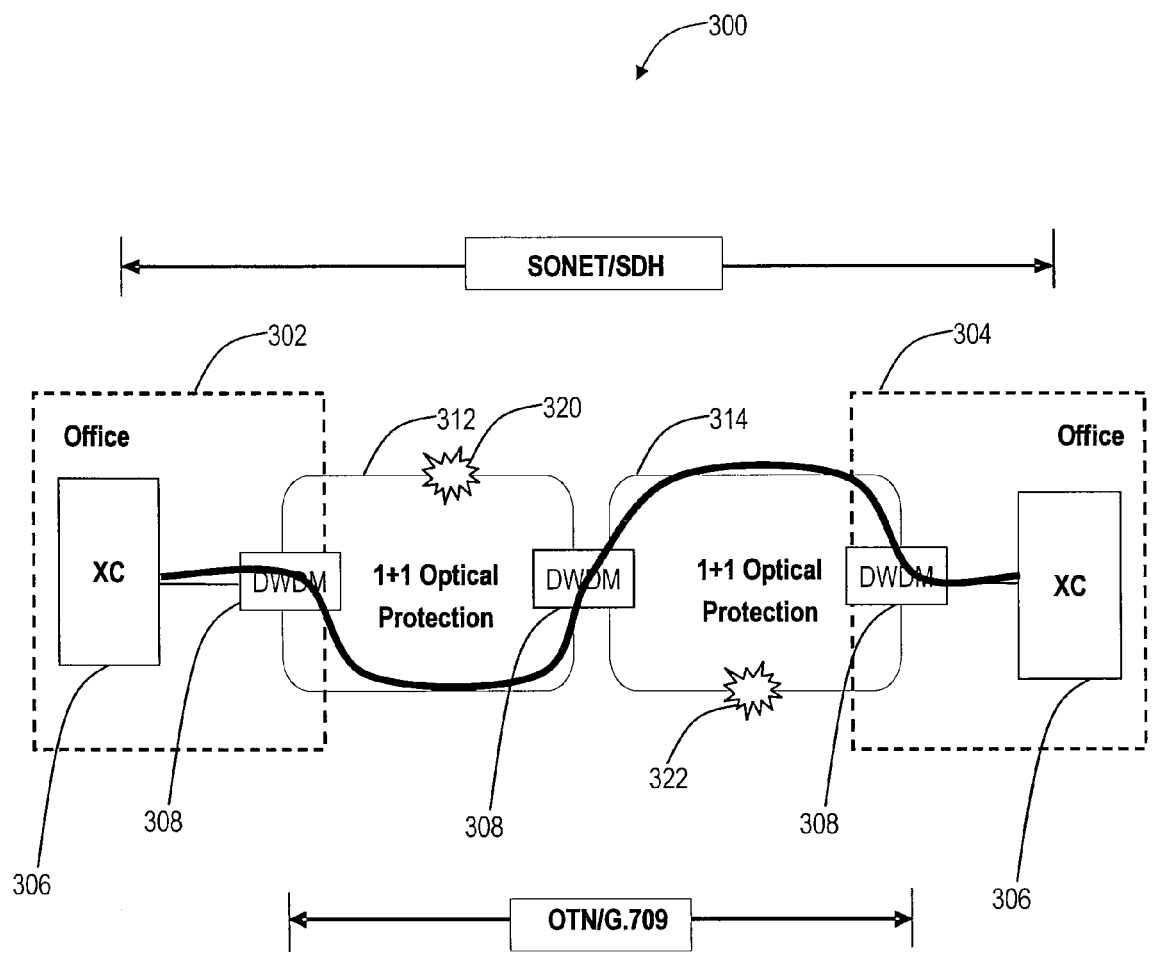
FIG. 42 is a diagram of the network from FIG. 41 with two simultaneous fiber failures according to an exemplary embodiment of the present invention.

Referring to FIG. 42, the network 300 is illustrated with two simultaneous fiber failures 320,322 according to an exemplary embodiment of the present invention. Based on the hold-off timer, the cross-connects 306 detect the failures 320, 322 but wait to implement mesh restoration. During this wait, the optical 1+1 protection is implemented after the DWDM platforms 308 detect the failures within each ring 312,314 and provide 1+1 switching. Accordingly, the cross-connects 306 have service restored prior to the hold-off timer expiring, and therefore do not implement mesh restoration. The DWDM platforms 308 can utilize OTN/G.709 to detect the fault on the rings 312,314. After detecting the failure 320 on the first ring 312, the DWDM platforms 308 switch on ring 312. After detecting the failure 322 on the second ring 314, the DWDM platforms 308 switch on the ring 314.

Figure 43:
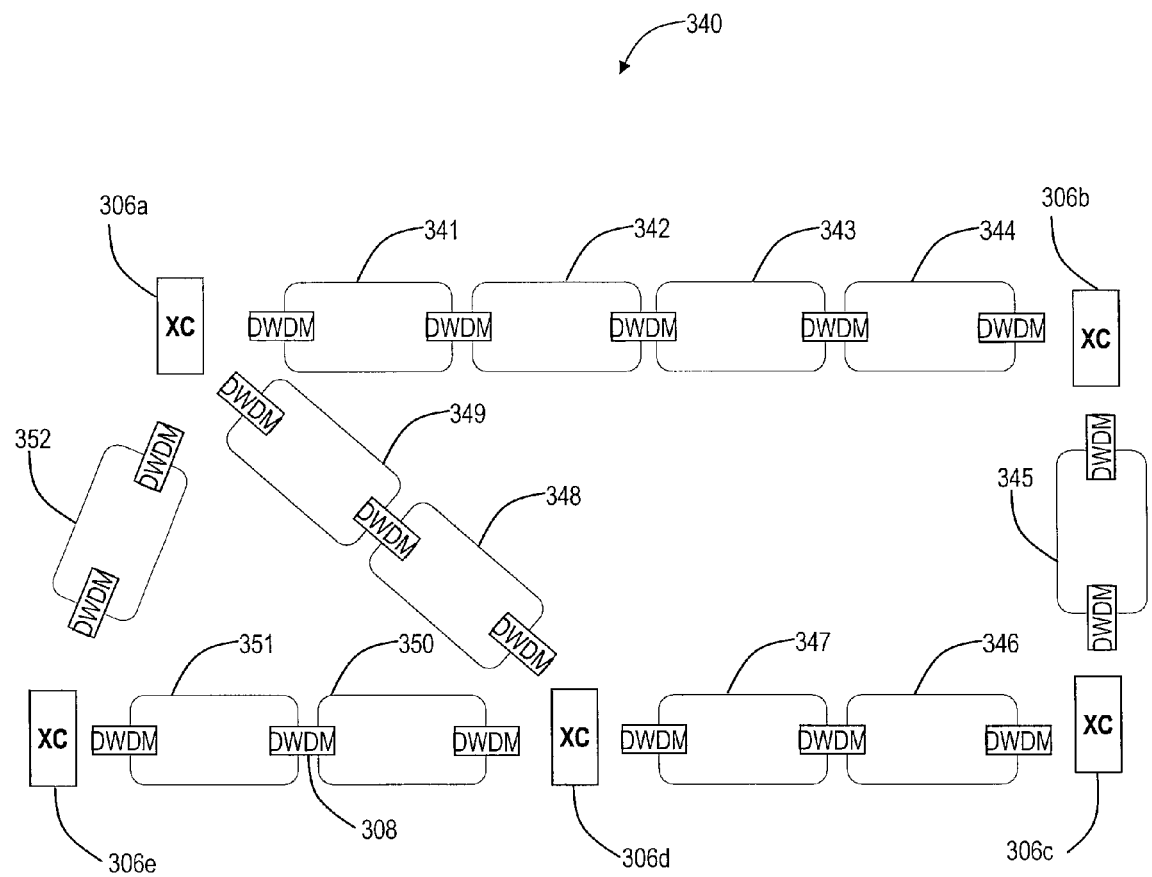
FIGS. 43-45 are diagrams of a network illustrating a large-scale deployment of cross-connects with cascaded protection rings according to an exemplary embodiment of the present invention.
Figure 44:
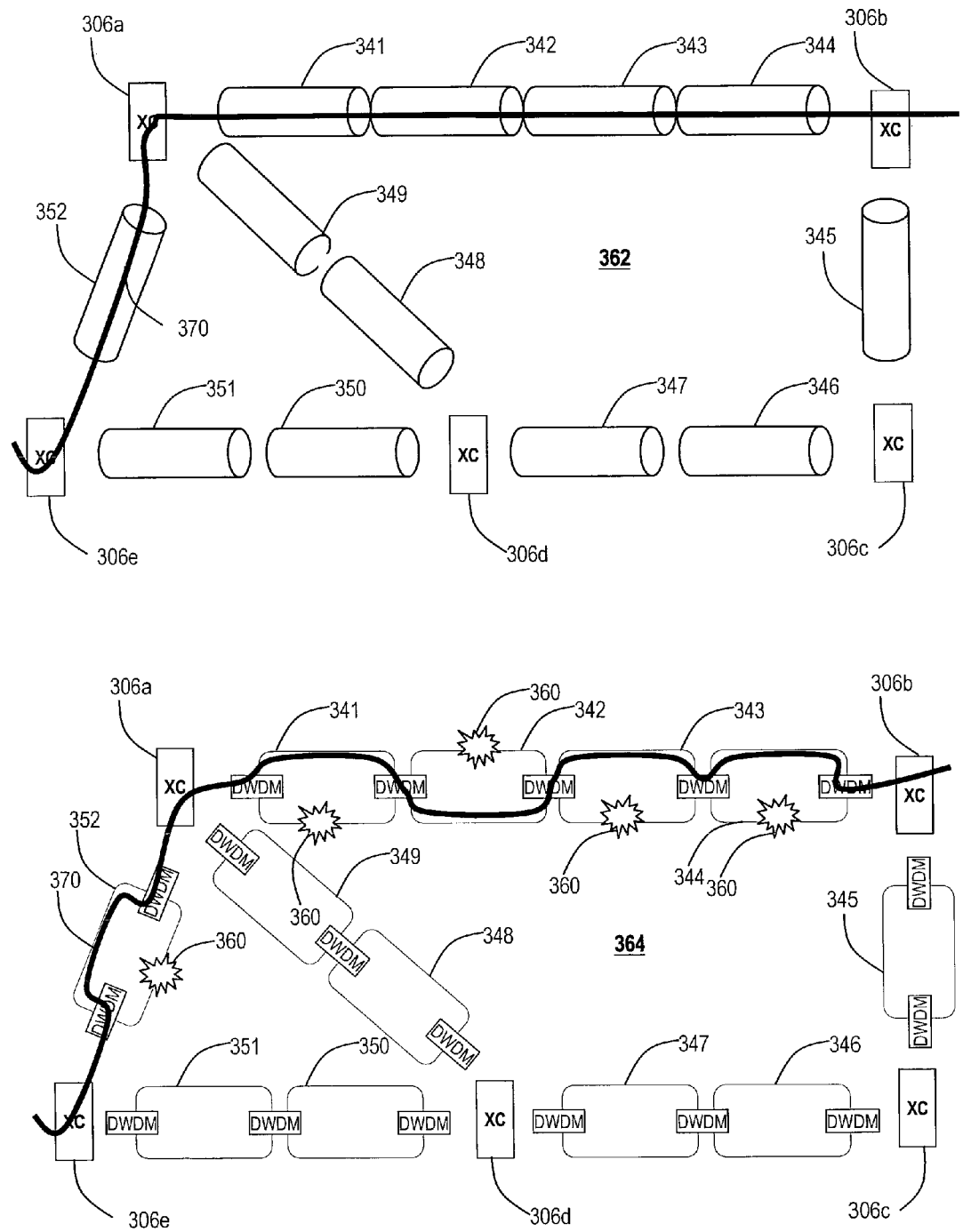
Figure 45:
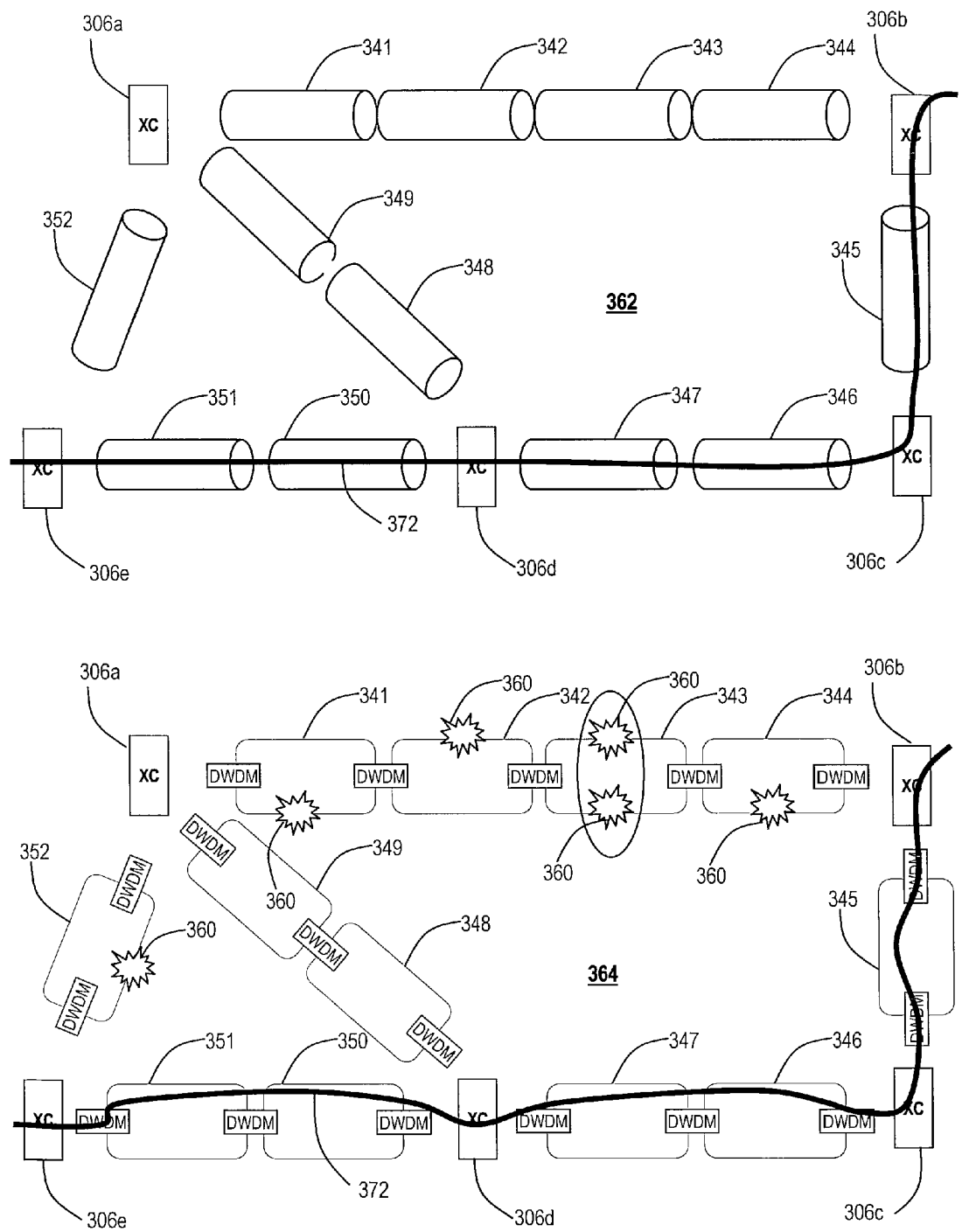

Referring to FIGS. 43-45, a network 340 illustrates a large-scale deployment of cross-connects 306a-e with cascaded protection rings 341-352 according to an exemplary embodiment of the present invention. FIG. 43 illustrates an equipment configuration of the network 340 with multiple DWDM platforms 308 forming the cascaded protection rings 341-352. Note, the rings 341-352 can include other DWDM platforms 308 and/or regenerators, optical amplifiers, and the like. For illustration purposes, only head-end nodes are illustrated on the rings 341-352.

FIG. 44 illustrates multiple fiber failures 360 on the various cascaded protection rings 341-352. A logical view 362 illustrates how the cross-connects 306a-e view the rings 341-352, i.e. as a pipe. A physical view 364 illustrates the physical deployment of the cross-connects 306a-e and the rings 341-352. From the cross-connects 306a-e viewpoint, the multiple failure 360 are ignored since the optical 1+1 recovers a connection 370 before expiration of the hold-off timer in the cross-connects 306e,306a,306b (i.e., the cross-connects affected by the failures 360). In the physical view 364, rings 341-343,352 perform 1+1 switching to recover based on the multiple failures 360.

FIG. 45 illustrates a second failure 360 on the ring 343 following the failures 360 in FIG. 44. Here, the connection 370 is now down since there is no fiber path on the rings 352,342-344 between cross-connect 306e,306a,306b. Now, the cross-connects 306e,306a,306b detect the failure and implement the hold-off timer again. However, the hold-off time expires without restoration of the connection 370. Accordingly, the cross-connects 306a-e implement mesh restoration to provide a connection 372 between cross-connects 306e,306d,306c,306b.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A directionless optical system, comprising:
a client device;
a reconfigurable optical node comprising two or more degrees each comprising a wavelength selective switch;
a directionless switch system connected to the two or more degrees and configured to route wavelengths, wherein the directionless switch system is disposed between the client device and the reconfigurable optical node and routing between the one or more degrees is performed external from the directionless switch system;
wherein the client device optically connects to the directionless switch system utilizing single or dual ports on the directionless switch system based on an associated protection scheme, wherein the single or dual ports comprise associated signals only from the client device, and wherein the directionless switch system is configured to optically route the associated signals between the client device and the two or more degrees providing an optical signal from the client device to the two or more degrees, and wherein the associated signals between the client device and the two or more degrees are optical and not hard-wired therebetween; and
a first transceiver and a second transceiver on the client device, wherein the first transceiver and the second transceiver are connected to the directionless switch system;
and
wherein the directionless switch system is configured to connect the first transceiver and the second transceiver to separate degrees of the two or more degrees.

2. The directionless optical system of claim 1, wherein the directionless switch system comprises a first switch module and a second switch module for redundancy, and wherein the first transceiver is connected to the first switch module and the second transceiver is connected to the second switch module.

3. The directionless optical system of claim 2, wherein the two or more degrees comprise a degree not initially utilized by the first transceiver and the second transceiver; and
wherein, responsive to a failure on one of the two or more degrees, the first switch module and the second switch module are configured to redirect one of the first transceiver and the second transceiver from the one of the two or more degrees to the degree to provide route diversity.

4. The directionless optical system of claim 3, wherein the client device comprises a router, and wherein the first transceiver and the second transceiver utilize layer three protection mechanisms.

5. The directionless optical system of claim 1, further comprising:
a regenerator/wavelength converter connected to the directionless switch system;
wherein the directionless switch system is configured to connect a signal from the two or more degrees to the regenerator/wavelength converter.

6. The directionless optical system of claim 1, and wherein the reconfigurable optical node comprises:
a first wavelength selective switch connected to a first one or more demultiplexers and to a first one or more multiplexers; and
a second wavelength selective switch connected to a second one or more demultiplexers and to a second one or more multiplexers;
wherein each of the first one or more demultiplexers, the first one or more multiplexers, the second one or more demultiplexers, and the second one or more multiplexers comprises a connection to the directionless switch system.

7. The directionless optical system of claim 6, wherein the directionless switch system comprises two or more optical switches, and wherein the first one or more demultiplexers, the first one or more multiplexers, the second one or more demultiplexers, and the second one or more multiplexers are each wavelength independent.

8. The directionless optical system of claim 1, wherein the reconfigurable optical node comprises:
a wavelength selective switch for each of the two or more degrees; and
a multi-channel fixed filter comprising one of a band-wide arrayed Waveguide or a cyclic Arrayed Waveguide connected to the wavelength selective switch.

9. A highly available directionless optical method, comprising:

providing a first path and a second path through a network between a first device and a second device, wherein the first device and the second device are each dynamically connected to the first path and the second path;

upon a failure on the first path, restoring service between the first device and the second device on the second path; and reconfiguring the first path to a third path by dynamically changing a connection from the first path on each of the first device and the second device to the third path;

wherein each of the first path and the second path comprises an optical network;

wherein dynamically connected comprises a directionless optical switch between each of the first path and the second path and each of the first device and the second device; and wherein restoring comprises performing mesh restoration at each of the first device and the second device following a hold-off time period, wherein the hold-off time period enables mesh restoration optically between the first device and the second device.

10. A highly available directionless optical network, comprising:

a first device comprising an optical connection to a first optical switch;

a first optical platform connected to the first optical switch, wherein the first optical platform comprises multiple degrees;

a second device comprising an optical connection to a second optical switch;

a second optical platform connected to the second optical switch, wherein the second optical platform comprises multiple degrees; and a plurality of interconnected reconfigurable optical nodes between the first optical platform and the second optical platform;

wherein the first optical switch and the second optical switch connect the first optical platform to the second optical platform through a first path and a second path;

wherein the first path utilizes a first degree of the multiple degrees on the first optical platform and a first degree of the multiple degrees on the second optical platform;

wherein the second path utilizes a second degree of the multiple degrees on the first optical platform and a second degree of the multiple degrees on the second optical platform;

wherein the first optical switch is configured to switch connections from one of the first path and the second path to a third degree of the multiple degrees on the first optical platform and a third degree of the multiple degrees on the second optical platform;

wherein the plurality of interconnected reconfigurable optical nodes are configured in a cascaded protection ring configuration between the first optical platform and the second optical platform;

wherein the first optical platform and the second optical platform are configured to provide optical 1+1 protection; and wherein the first device and the second device are mesh restored with a hold-off timer operable to delay mesh restoration for a time period allowing the optical 1+1 protection to reestablish service.

11. The highly available directionless optical network of claim 10, further comprising one or more regenerators at one or more of the plurality of interconnected reconfigurable optical nodes;

wherein each of the one or more of the plurality of interconnected reconfigurable optical nodes comprise an optical switch connected to the one or more regenerators.

12. A directionless reconfigurable optical add/drop node, comprising:

a wavelength selective switch located between a degree of the optical add/drop node and a multi-channel fixed filter, wherein the multi-channel fixed filter comprises one of a band-wide arrayed Waveguide or a cyclic Arrayed Waveguide;

an optical switch connected to the multi-channel fixed filter and configured to route wavelengths from the multi-channel fixed filter; and a client device optically connected to one or two ports of the optical switch, wherein the one or two ports of the optical switch comprise associated signals only from the client device;

wherein the optical switch is disposed between the client device and the wavelength selective switch and routing between the degree and other degrees of the optical add/drop node is performed external from the optical switch;

wherein the wavelength selective switch is configured to provide single channel selectivity across a plurality of wavelengths;

wherein the multi-channel fixed filter receive one of the plurality of wavelengths within a multi-channel range of the multi-channel fixed filter; and wherein the optical switch routes the one of the plurality of wavelengths to the client device and wherein the one of the plurality of wavelengths between the client device and the degree is optical and not hard-wired therebetween.

* * * * *